US 9,204,371 B2

(12) United States Patent  
Liu

(10) Patent No.: US 9,204,371 B2
(45) Date of Patent: Dec. 1, 2015

(54) 802.11 RESTRICTED ACCESS WINDOWS

(71) Applicant: Marvell World Trade Ltd., St. Michael (BB)

(72) Inventor: Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 151 days.

(21) Appl. No.: 13/680,876

(22) Filed: Nov. 19, 2012

(65) Prior Publication Data

US 2013/0128798 A1   May 23, 2013

Related U.S. Application Data

(60) Provisional application No. 61/563,399, filed on Nov. 23, 2011, provisional application No. 61/636,010, filed on Apr. 20, 2012.

(51) Int. Cl.
*H04W 48/12* (2009.01)
*H04W 74/08* (2009.01)
*H04W 74/06* (2009.01)

(52) U.S. Cl.
CPC .......... *H04W 48/12* (2013.01); *H04W 74/0875* (2013.01); *H04W 74/06* (2013.01)

(58) Field of Classification Search
USPC .................................................. 370/336, 348
See application file for complete search history.

(56) References Cited

U.S. PATENT DOCUMENTS

| 7,664,089 | B2 | 2/2010 | Zhao |
| 7,710,930 | B2 | 5/2010 | Kwak |
| 8,036,241 | B2 | 10/2011 | Ji et al. |
| 8,045,574 | B2 | 10/2011 | Sherman et al. |
| 8,121,108 | B2 | 2/2012 | Kwon et al. |
| 8,265,061 | B1 | 9/2012 | Smith et al. |
| 8,355,389 | B2 | 1/2013 | Kasslin et al. |
| 8,411,699 | B2 | 4/2013 | Ohmi |
| 8,468,615 | B2 | 6/2013 | Tremp |
| 2003/0012163 | A1 | 1/2003 | Cafarelli et al. |

(Continued)

FOREIGN PATENT DOCUMENTS

| EP | 1513295 | 3/2005 |
| EP | 1553730 A1 | 7/2005 |

(Continued)

OTHER PUBLICATIONS

PCT Internation Search Report and Written Opinon for related Application No. PCT/US2012/066246; Jan. 23, 2013; 5 pages.

(Continued)

*Primary Examiner* — Huy D Vu
*Assistant Examiner* — Teisha D Hall

(57) ABSTRACT

A method of operating an access point includes defining a restricted access window during which stations that belong to a same infrastructure basic service set as the access point are not allowed to transmit data frames. The method further includes generating a beacon announcing the restricted access window, and transmitting the beacon to the stations that belong to the same infrastructure basic service set as the access point. The method also includes, during the restricted access window, receiving a poll frame from a first station of the stations that belong to the same infrastructure basic service set as the access point. The method further includes, subsequent to the poll frame, transmitting a data frame to the first station.

44 Claims, 16 Drawing Sheets

(56) References Cited

U.S. PATENT DOCUMENTS

| | | |
|---|---|---|
| 2004/0203979 A1 | 10/2004 | Attar et al. |
| 2004/0218555 A1 | 11/2004 | Chen et al. |
| 2005/0047386 A1* | 3/2005 | Yi .................................. 370/345 |
| 2005/0105504 A1 | 5/2005 | Sakoda |
| 2006/0187964 A1 | 8/2006 | Li et al. |
| 2007/0025244 A1 | 2/2007 | Ayyagari et al. |
| 2007/0041353 A1 | 2/2007 | Li et al. |
| 2007/0076675 A1 | 4/2007 | Chen |
| 2007/0160021 A1 | 7/2007 | Xhafa et al. |
| 2007/0217378 A1 | 9/2007 | Moorti et al. |
| 2007/0280246 A1 | 12/2007 | Berkman et al. |
| 2007/0286222 A1 | 12/2007 | Balasubramanian |
| 2008/0144558 A1 | 6/2008 | Wentink |
| 2008/0146253 A1 | 6/2008 | Wentink |
| 2008/0151814 A1 | 6/2008 | Jokela |
| 2008/0240049 A1 | 10/2008 | Gaur |
| 2008/0247376 A1 | 10/2008 | Del Prado Pavon et al. |
| 2008/0310391 A1 | 12/2008 | Schneidman et al. |
| 2009/0010191 A1 | 1/2009 | Wentink |
| 2009/0016306 A1 | 1/2009 | Wang et al. |
| 2009/0109887 A1 | 4/2009 | Chandra et al. |
| 2009/0196163 A1 | 8/2009 | Du |
| 2009/0196212 A1 | 8/2009 | Wentink |
| 2010/0165973 A1 | 7/2010 | Su et al. |
| 2010/0192001 A1 | 7/2010 | Cornwall et al. |
| 2010/0278088 A1 | 11/2010 | Goldman |
| 2010/0309831 A1 | 12/2010 | Yeh et al. |
| 2010/0315999 A1 | 12/2010 | Kakani et al. |
| 2011/0026446 A1 | 2/2011 | Stacey |
| 2011/0122780 A1 | 5/2011 | Nieminen et al. |
| 2011/0176521 A1 | 7/2011 | Park et al. |
| 2011/0268054 A1 | 11/2011 | Abraham et al. |
| 2012/0106418 A1 | 5/2012 | Xhafa et al. |
| 2012/0120858 A1 | 5/2012 | Das et al. |
| 2012/0147800 A1 | 6/2012 | Park et al. |
| 2012/0159001 A1 | 6/2012 | Liu et al. |
| 2012/0219099 A1 | 8/2012 | Loukianov |
| 2012/0263094 A1 | 10/2012 | Wentink |
| 2012/0315943 A1* | 12/2012 | Chu et al. ....................... 455/512 |
| 2013/0176902 A1 | 7/2013 | Wentink et al. |
| 2013/0258931 A1 | 10/2013 | Gonikberg et al. |
| 2014/0119268 A1* | 5/2014 | Chu et al. ....................... 370/312 |
| 2014/0153463 A1 | 6/2014 | Park et al. |

FOREIGN PATENT DOCUMENTS

| | | |
|---|---|---|
| WO | WO-2008111496 A2 | 9/2008 |
| WO | WO-2012122119 A1 | 9/2012 |

OTHER PUBLICATIONS

Park, Miuyoung; IEEE P802.11; Jul. 2012; 32 pages.
Ghosh, Chittabrata et al.; Restricted Access Window Signaling for Uplink Channel Access; Jul. 16, 2012; 13 pages.
Liu, Siyang et al.; DCF Enhancements for Large Number of STAs; Sep. 15, 2011; 11 pages.
Revolution Wi-Fi The Wireless Professional's Connection for Independent Analysis; Wireless QoS Part 1—Background Information; Jul. 28, 2010; 11 pages.
Mangold, Stefan et al.; IEEE 802.11e Wireless LAN for Quality of Service; 2002; 8 pages.
Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).
IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.
de Vegt, Rolf; Potential Compromise for 802.11ah Use Case Document; IEEE 802.11-11/0457r0; Mar. 2011; 27 pages.

IEEE P802.11ac/D2.0 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).
IEEE Std 802.11b-1999/Cor Jan. 2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer (PHY) extension in the 2.4 GHz band-Corrigendum 1 ," *The Institute of Electrical and Electronics Engineers, Inc.*, Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).
IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Search Report and Written Opinion in International Application No. PCT/US2012/034091 dated Nov. 27, 2012.
PCT International Search Report for related Application No. PCT/US2013/044473; Oct. 29, 2013; 5 pages.
International Preliminary Report on Patentability in Int'l App. No. PCT/US2012/034091, mailed Oct. 31, 2013.
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
Stacey et al., "IEEE P802.11, Wireless LANs, Proposed TGac Draft Amendment," Institute of Electrical and Electronics Engineers, doc. No. IEEE 802.11-10/1361 r3 (Jan. 2011).
Stacey et al., "Specification Framework for TGac," document No. IEEE 802.11-09/0992r20, Institute for Electrical and Electronics Engineers, pp. 1-49, Jan. 18, 2011.
IEEE Std 802.11 ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," The Institute of Electrical and Electronics Engineers, Inc., Mar. 2012.
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
IEEE Std 802.11 af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.
Yu, et al. "Coverage extension for IEEE802.11 ah," The Institute of Electrical and Electronics Engineers, doc. No. IEEE 802.11-11/0035r1, (Jan. 2011).
Taghavi et al., "Introductory Submission for TGah", doc. No. IEEE 802.11-11/0062r0, Institute tor Electrical and Electronics Engineers, pp. 1-5 (Jan. 14, 2011).
Zhang et al., "11 ah Data Transmission Flow," The Institute of Electrical and Electronics Engineers, doc. No. IEEE 802.11-11/1484r1, (Nov. 2011).
Vermani, et al. "Preamble Format for 1 MHz," The Institute of Electrical and Electronics Engineers, doc. No. IEEE 802.11-11/1482r2, (Nov. 2011).
Zhang et al., "1MHz Waveform in Wider BW", The Institute of Electrical and Electronics Engineers, doc. No. IEEE 802.11-12/0309r1, (Mar. 2012).
Vermani, et al. "Spec Framework Text for PHY Numerology," The Institute of Electrical and Electronics Engineers, doc. No. IEEE 802.11-11/1311 rO, (Sep. 2011).
Zhao, Liqiang et al.; Hybrid DCF Supporting Hybrid Antennas in a WLAN; IMACS Multiconference; Oct. 4-6, 2006.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999.
Park, Minyoung. "IEEE P802.11 Wireless LANs Proposed Specification Framework for TGah." TGac Spec Framework. 13 pages. Mar. 12, 2012.
Low Power Capability Support for 802.11ah dated Jan. 17, 2011.
U.S. Appl. No. 61/475,776 dated Apr. 15, 2011.

* cited by examiner

Dedicated DTIMs for AID Groups

Segmenting Dedicated DTIMs

802.11 RESTRICTED ACCESS WINDOWS

CROSS-REFERENCE TO RELATED APPLICATIONS

This present disclosure claims the benefit of U.S. Provisional Application No. 61/563,399, filed on Nov. 23, 2011, and U.S. Provisional Application No. 61/636,010, filed on Apr. 20, 2012. The entire disclosures of the applications referenced above are incorporated herein by reference.

FIELD

The present disclosure generally relates to wireless local area networks, and more particularly to restricted access windows following beacon frames in extensions to IEEE 802.11.

BACKGROUND

FIG. 1 shows a power-saving scheme according to IEEE Standard 802.11-2012, the entire disclosure of which is incorporated herein by reference. In FIG. 1, three stations A, B, and C form an independent basic service set (IBSS), also known as ad hoc mode. Each of the stations alternates between a doze (or, sleep) state, in which data is not transmitted or received, and an awake state, in which data can be transmitted and received. Each of the stations is required to wake up just before each beacon, three of which are shown at 104-1, 104-2, and 104-3 (collectively, "beacons 104").

After waking up for the beacon, each station remains awake for a period of time called an announcement traffic indication message (ATIM) window. During the ATIM window, each station determines whether buffered frames can be sent to other stations and whether to expect to receive frames buffered at other stations.

For example, see the ATIM window following beacon 104-2 of FIG. 1. Station A transmits an ATIM frame 108 to station B, which is shown receiving the ATIM frame at 112. Station B acknowledges that station B will wait to receive data from station A by transmitting an acknowledgment 116, shown being received by station A at 120.

Because station A has identified an available recipient for a buffered frame, and because station B expects to receive a frame from a sender, stations A and B will remain in the awake state after the ATIM window and not return to the doze state. By contrast, station C, which does not have frames to transmit to stations A or B, and has not been notified of any queued frames at station A or station B, returns to the doze state after the ATIM window.

As prearranged, after the ATIM window, station A transmits a data frame 124 to station B, which is shown being received at 128. Station B signals a successful transmission by transmitting an acknowledgement 132 to station A, shown being received at 136. Stations A and B then remain awake for the remainder of the beacon interval—i.e., the time until the next beacon 104-3. Stations A and B, along with station C, are all awake for the ATIM window following beacon 104-3. This approach allows stations to doze for a significant portion of each beacon interval, and only remain awake when data transfer has been prearranged.

The background description provided here is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

An access point includes a restricted access window module, a beacon creation module, a transmitter module, a downlink tracking module, and a data transmission module. The restricted access window module is configured to define a restricted access window during which stations that belong to a same infrastructure basic service set as the access point are not allowed to transmit data frames. The beacon creation module is configured to generate a beacon announcing the restricted access window.

The transmitter module is configured to transmit the beacon to the stations that belong to the same infrastructure basic service set as the access point. The downlink tracking module is configured to, during the restricted access window, receive a poll frame from a first station of the stations that belong to the same infrastructure basic service set as the access point. The data transmission module is configured to, subsequent to the poll frame, transmit a data frame to the first station.

A method of operating an access point includes defining a restricted access window during which stations that belong to a same infrastructure basic service set as the access point are not allowed to transmit data frames. The method further includes generating a beacon announcing the restricted access window, and transmitting the beacon to the stations that belong to the same infrastructure basic service set as the access point. The method also includes, during the restricted access window, receiving a poll frame from a first station of the stations that belong to the same infrastructure basic service set as the access point. The method further includes, subsequent to the poll frame, transmitting a data frame to the first station.

An access point includes a restricted access window module, a beacon creation module, and a transmitter module. The restricted access window module is configured to define a restricted access window during which stations that belong to a same infrastructure basic service set as the access point are permitted to transmit only a first set of frame types. The beacon creation module is configured to generate a beacon announcing the restricted access window. The transmitter module is configured to transmit the beacon to the stations that belong to the same infrastructure basic service set as the access point. In various features, the first set of frame types excludes data frames. In other features, the first set of frame types includes poll frames and control frames.

An access point includes a restricted access window module, a beacon creation module, and a transmitter module. The restricted access window module is configured to define a restricted access window during which only a subset of stations that belong to a same infrastructure basic service set as the access point are permitted to transmit. The beacon creation module is configured to generate a beacon announcing the restricted access window. The transmitter module is configured to transmit the beacon to the stations that belong to the same infrastructure basic service set as the access point. In other features, the subset is defined by association identifiers of the stations that belong to a same infrastructure basic service set as the access point. In further features, the subset is defined by station types of the stations that belong to a same infrastructure basic service set as the access point.

An access point includes a restricted access window module, a beacon creation module, and a transmitter module. The restricted access window module is configured to define a restricted access window during which stations that belong to a same infrastructure basic service set as the access point are permitted to transmit only frames having a first value of a transmission characteristic. The beacon creation module is configured to generate a beacon announcing the restricted access window. The transmitter module is configured to transmit the beacon to the stations that belong to the same infrastructure basic service set as the access point. In other features, the transmission characteristic is one of maximum transmission duration limit and priority.

An access point includes a restricted access window module, a beacon creation module, and a transmitter module. The restricted access window module is configured to define a restricted access window during which stations that belong to a same infrastructure basic service set as the access point are permitted to transmit frames using a first value of a medium access parameter. The beacon creation module is configured to generate a beacon announcing the restricted access window. The transmitter module is configured to transmit the beacon to the stations that belong to the same infrastructure basic service set as the access point. In other features, the medium access parameter is slot time.

An access point includes a restricted access window module, a beacon creation module, and a transmitter module. The restricted access window module is configured to define a restricted access window having a plurality of timeslots. The beacon creation module is configured to generate a beacon announcing the restricted access window. The transmitter module is configured to transmit the beacon to the stations that belong to the same infrastructure basic service set as the access point.

In other features, each of the stations that belong to the same infrastructure basic service set as the access point are assigned to ones of the timeslots. In further features, each of a subset of the stations that belong to the same infrastructure basic service set as the access point are assigned to ones of the timeslots. In still other features, selected slots of the timeslots are reserved for transmissions from stations that belong to the same infrastructure basic service set as the access point but that are not specifically assigned to others of the timeslots. In further features, selected slots of the timeslots are reserved for transmissions from stations unable to transmit during their assigned timeslots. In still other features, groups of stations that belong to the same infrastructure basic service set as the access point are assigned to different ones of the timeslots.

In other features, a first station of the stations that belong to the same infrastructure basic service set as the access point is assigned to a first slot of the timeslots, and the first station begins channel access at a beginning of the first slot of the restricted access window. In other features, the first station is permitted to continue transmitting after a beginning of a second slot of the timeslots, the second slot being subsequent to the first slot.

In other features, the restricted access window module is configured to define a second restricted access window that is subsequent to the restricted access window but prior to a second beacon. In other features, the second restricted access window has a second plurality of timeslots. The transmitter module is configured to transmit the second beacon subsequent to the beacon without transmitting any intervening beacons. The second plurality of timeslots of the restricted access window have different durations than the plurality of timeslots of the second restricted access window.

In other features, the plurality of timeslots each has a first duration, the second plurality of timeslots each has a second duration, and the second duration is different than the first duration. In other features, the restricted access window module is configured to define a second restricted access window that is subsequent to the restricted access window but prior to a second beacon, and the second restricted access window has a second plurality of timeslots. The transmitter module is configured to transmit the second beacon subsequent to the beacon without transmitting any intervening beacons. Each of a first subset of the stations that belong to the same infrastructure basic service set as the access point are respectively assigned to ones of the plurality of timeslots. Each of a second subset of the stations that belong to the same infrastructure basic service set as the access point are respectively assigned to ones of the second plurality of timeslots.

In other features, the restricted access window module is configured to define a second restricted access window that is subsequent to the restricted access window but prior to a second beacon. The second restricted access window has a second plurality of timeslots. The transmitter module is configured to transmit the second beacon subsequent to the beacon without transmitting any intervening beacons. Each of a first subset of the stations that belong to the same infrastructure basic service set as the access point are respectively assigned to ones of the plurality of timeslots according to a first mapping. Each of the first subset of the stations that belong to the same infrastructure basic service set as the access point are respectively assigned to ones of the second plurality of timeslots according to a second mapping.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused for similar or identical elements.

DESCRIPTION

Figure 1:
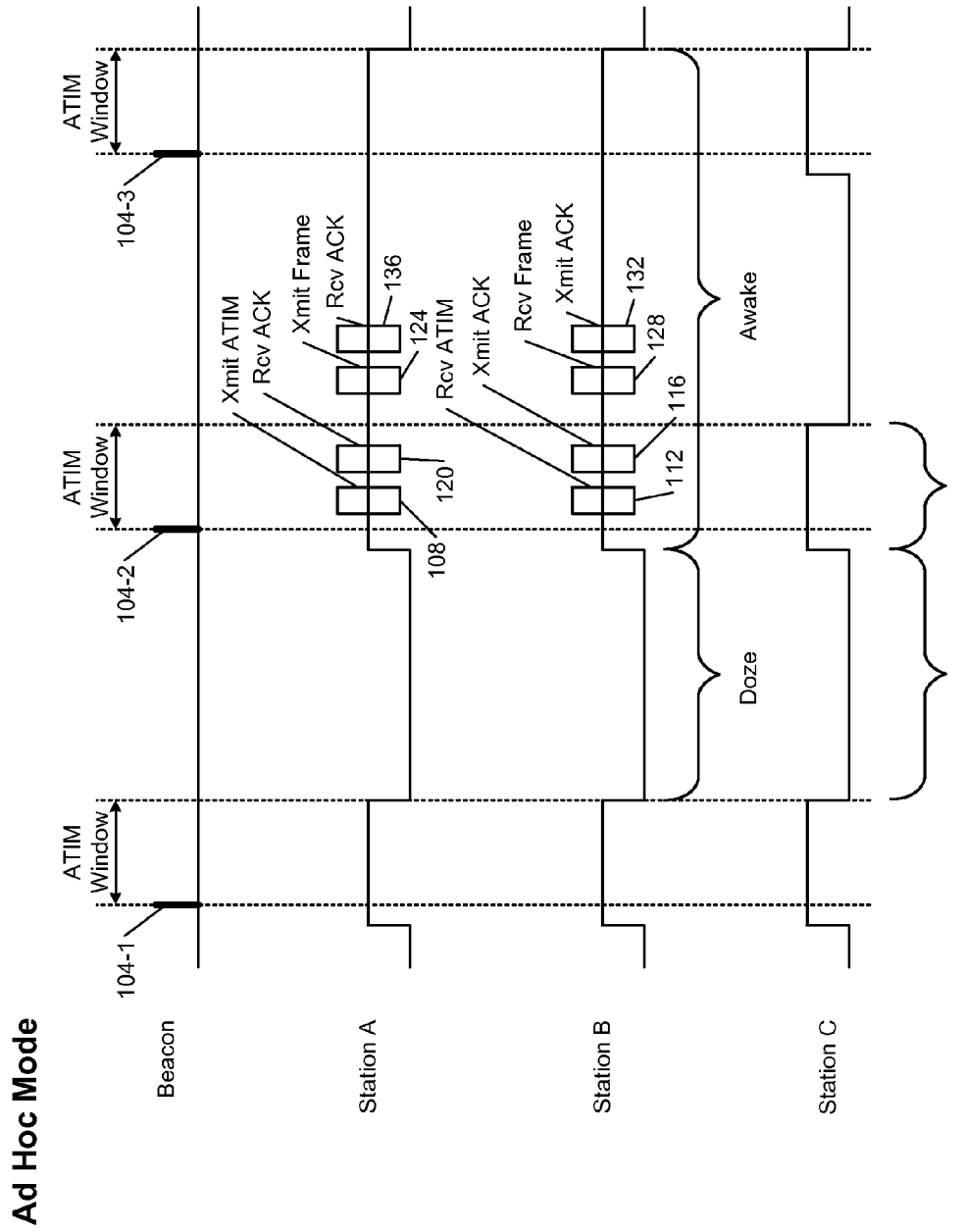
FIG. 1 is a timing diagram of announcement traffic indication messages according to the prior art.

The concept of an ATIM window in ad hoc mode can be adapted to infrastructure mode. In an infrastructure basic service set (BSS), beacons are periodically transmitted by an access point (AP) based on a target beacon transmission time (TBTT). Power-saving stations associated with the BSS are expected to wake up to receive each beacon that includes a delivery traffic indication message (DTIM). In the DTIM, the AP can announce a window of time, following the DTIM, during which transmissions can be prearranged. Power-saving stations may return to a doze state if no relevant transmissions are arranged during the window. This window is called a restricted access window (RAW) in this disclosure.

The AP may be able to create more than one RAW in any given beacon interval, and can designate a wide variety of restrictions, described in more detail below. Allowing time for prearranging of transmissions is only one potential use of the RAW. Further, a RAW can be divided into different portions, with various uses for each portion. For example only, and as described in further detail below, the AP may assign certain stations to respective portions of a RAW.

When a station joins an infrastructure BSS, the AP assigns an association identifier (AID) to the station and uses that AID to refer the station instead of some other mechanism, such as medium access control (MAC) address. For example only, while a MAC address may be 48 or 64 bits long, the AID may be shorter, such as 11 bits, 14 bits, or 16 bits long.

In various implementations, the DTIM may include a partial virtual bitmap (PVB), each bit corresponding to an AID of a station. By setting the corresponding bit in the PVB to one, the AP indicates to the station that the AP possesses buffered frames for the station. When a station recognizes that the bit corresponding to the station's AID is set to one in the PVB, the station should request the data from the AP. For purposes of illustration only, the AP may support up to two thousand eight stations, and therefore uses up to two thousand eight AIDs. In these cases, the PVB can be up to two thousand eight bits long, although the use of compression means that the PVB is often much shorter.

In a large BSS with a significant number of stations, there may be many bits set in the PVB, indicating that the AP is buffering frames for many stations. There may also be many stations that wish to uplink data to the AP. The AP may use a RAW to determine which stations are available to receive the buffered frames, and which stations may wish to uplink data to the AP.

The AP may announce a RAW using a data structure within the DTIM. In the simplest case, the RAW begins upon completion of the DTIM and ends after a specified period of time. During the RAW, transmissions to the AP may be limited in various respects. For example, only certain types of frames may be sent, such as control, management, and null frames. For example, these frames may be used to schedule transmissions to occur subsequent to the RAW.

When the RAW allows only control, management, and null frames, a station may indicate to the AP that the station has data to uplink to the AP. A station may also indicate to the AP that the station is present and wishes to retrieve frames being queued by the AP. This may be prompted by the station identifying the corresponding bit being set in PVB of the DTIM, or may be performed when the station is expecting data to be available at the AP. The RAW allows these indications to occur without interference from comparatively time-consuming data transmissions.

A RAW can be used for other purposes as well. For example, the RAW may allow only data frames belonging to certain access categories (quality of service levels). Such a RAW may allow for the highest priority data to be communicated without having to contend with lower priority data. The remainder of the beacon interval after the RAW concludes can be used for lower priority traffic. This ensures that at least a portion of the high priority traffic is accommodated during each DTIM beacon interval, even if there is a significant amount of lower priority traffic.

Additionally or alternatively, the RAW may restrict which stations can transmit, for example limiting transmission to an explicitly defined subset of all the stations, or a predefined group of stations. For example, sensor stations may be differentiated from stations offloading data from cellular networks, which may be referred to as 3G offloading. The RAW may also be restricted to certain medium access parameters, such as using a short aSlotTime compared to a long aSlotTime. In addition, the RAW may be restricted to certain transmission types, such as a max transmission duration limit.

Stations that have more significant constraints on power consumption may be allowed to use the RAW to better allow the stations to quickly return to a power-saving doze state. Such power-saving stations may schedule uplink and/or downlink transmissions to occur subsequent to the RAW period. Additionally or alternatively, the AP may allow some data to be exchanged with these stations during the RAW.

When the AP has significant amounts of data buffered for a large number of stations, polling requests from individual stations during the RAW indicate those stations' willingness and ability to receive data. The AP may therefore, during the RAW, transfer corresponding queued frames from a software cache to hardware buffers to allow for prompt transmission of the queued frames following the RAW.

Based on information gathered in a first RAW, the AP may schedule further RAWs dynamically. The AP may announce an additional raw using a specific frame, such as a reservation frame. For example, the AP may announce a second RAW if the first RAW is heavily congested and the AP believes additional time would allow for transmissions unable to be performed during the first RAW.

In other implementations, the AP may define slot times within the second RAW for predetermined communications. For example, if the AP has been notified of 16 stations that wish to uplink data, the AP may announce a second RAW having 16 slots and assign each of the 16 stations to a respective one of the slots. The AP may communicate this information to the stations based on the stations' AIDs. In fact, the AP may segment the first RAW into slots, which may be assigned based on stations for which the AP is currently buffering frames. Additionally or alternatively, slots may be reserved based on AID group, access category, and/or frame type. A mapping of stations to slots in a first RAW may be different than a mapping of stations to slots in a second RAW. For example only, a first set of stations may be mapped to slots in both the first RAW and the second RAW, but may be mapped in a different order—i.e., the transmit slot within a RAW for a certain station is different for different RAWs.

The AP may specify multiple RAWs at a time within a single data structure of the DTIM. These RAWs may be contiguous or may be separated within the following beacon interval. If the AP determines that the first RAW is underutilized, the AP may have the ability to end the RAW prematurely, thereby allowing regular data exchange to occur without waiting for the originally announced end of the RAW. The AP may also have the ability to preemptively cancel upcoming RAWs.

Even in situations where a RAW is reserved for frames such as control, management, and null frames, certain power-saving stations may be permitted to transmit small amounts of high priority data. Specific limitations may be imposed on stations uploading high priority data. For example, a station may be limited to a single frame exchange during one RAW and that single frame exchange may be limited in duration.

Stations that are even more power-sensitive, referred to in this disclosure as active polling stations, may wake up only occasionally, such as once per day, and not in synchronization with beacons. These polling stations may be allowed to transmit data immediately upon waking up, subject to channel access rules.

Data transmissions, poll frames, and uplink indication frames from these active polling stations may therefore occur at any time, including during RAWs where such packets would generally not be allowed. Upon waking up, an active polling station may be programmed to send an active poll frame. The AP responds to the active poll frame by informing the active polling station of whether a RAW is currently in progress, when to expect a current RAW to end, and when to expect another beacon.

Figure 2A:
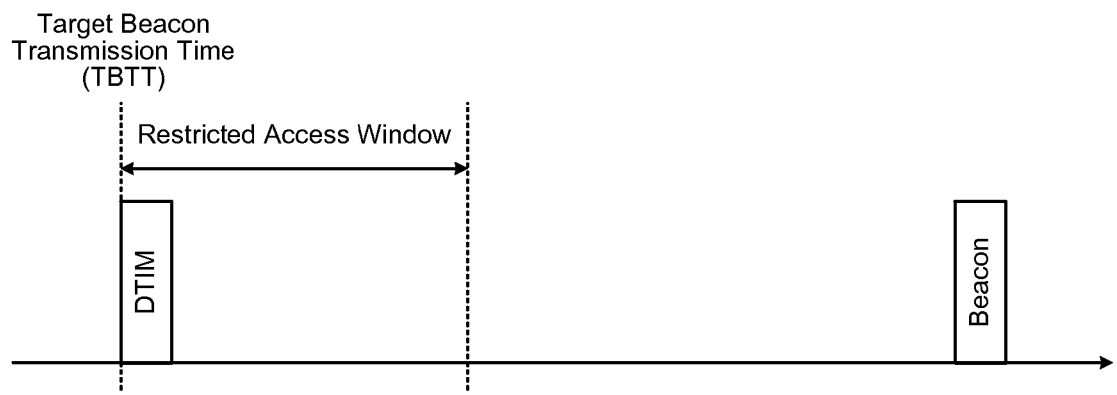
FIGS. 2A-12C are graphical timelines of example activity related to restricted access windows.

In FIG. 2A, a delivery traffic indication map (DTIM) is shown being transmitted by an AP at approximately a target beacon transmission time (TBTT). The DTIM announces that a restricted access window (RAW) will be created, and may specify the duration of the RAW. In addition to informing stations familiar with RAWs of how long the RAW will be, the duration may allow stations unfamiliar with RAWs to set their network allocation vector (NAV) based on the specified duration. By setting the NAV, these stations will not interfere with transmissions during the RAW. Frames transmitted during the RAW may inherit the remaining duration of the RAW, and may announce this as their duration.

The DTIM may only specify the duration or ending time of the RAW, and therefore the beginning of the RAW could be considered to be the beginning of the DTIM frame or the TBTT. According to IEEE Standard 802.11-2012, the DTIM should be sent as soon as possible after TBTT subject to channel access rules. Regardless of when the RAW technically begins, the RAW does not effectively begin to function until after the end of the DTIM.

Figure 2B:
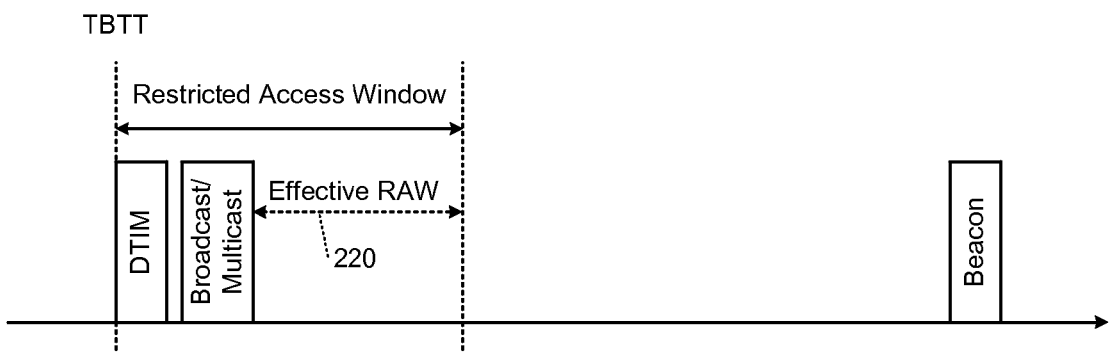

In FIG. 2B, the AP transmits broadcast/multicast data immediately subsequent to the DTIM. Because normal power-saving stations are required to wake up for the DTIM, this may be the best time to transmit the broadcast/multicast data so that the data will be received by all the intended recipients. The DTIM may include one or more bits indicating that broadcast and multicast data will be sent, thereby instructing power-saving stations not to return to doze immediately following the DTIM and instead wait for the broadcast/multicast data. Because the AP transmits the broadcast/multicast data immediately after the DTIM, the effective size of the RAW is reduced, as shown graphically at 220 in FIG. 2B.

Each beacon may include a traffic indication map (TIM) but only one out of every N beacons is a DTIM. The value of N is an integer greater than or equal to one, and may be transmitted within each beacon. When the integer is equal to one, every beacon is a DTIM. Each beacon may also indicate the number of beacons before the next DTIM.

Figure 3A:
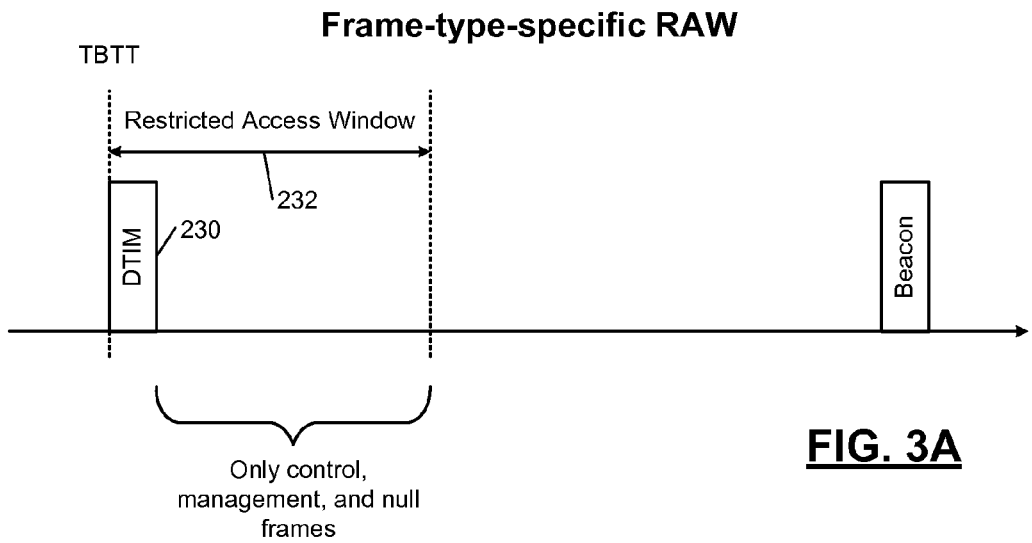

In FIG. 3A, a DTIM 230 announces a RAW 232 during which only control, management, and null frames are allowed to be sent. After the RAW, the remaining time until the next beacon may be opened to any type of frame.

Figure 3B:
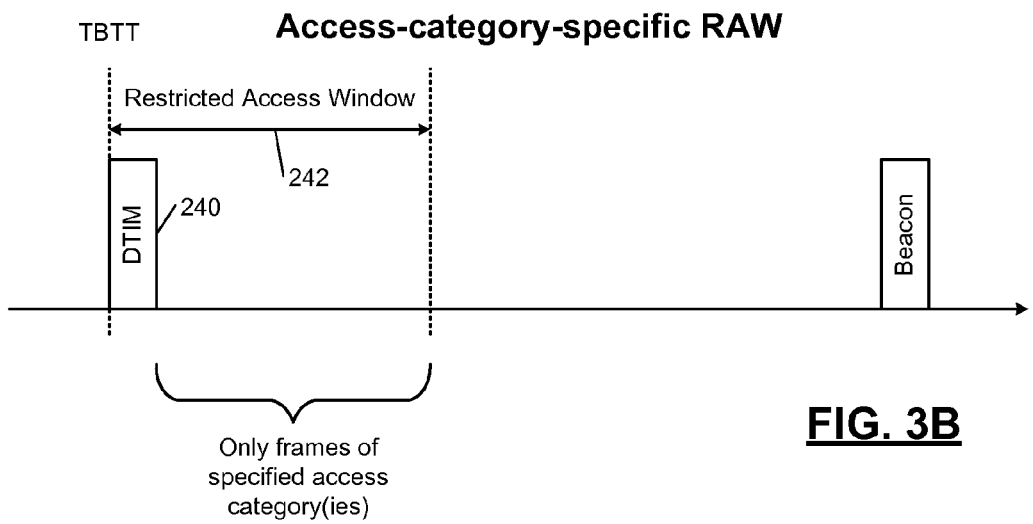

In FIG. 3B, a DTIM 240 announces a RAW 242 during which only frames of one or more specified access categories can be transmitted. For example only, the DTIM 240 may specify that, during the RAW 242, only video and voice frames (the highest priority access categories) are allowed to be transmitted. Upon conclusion of the RAW 242, data of all access categories may be transmitted.

Figure 3C:
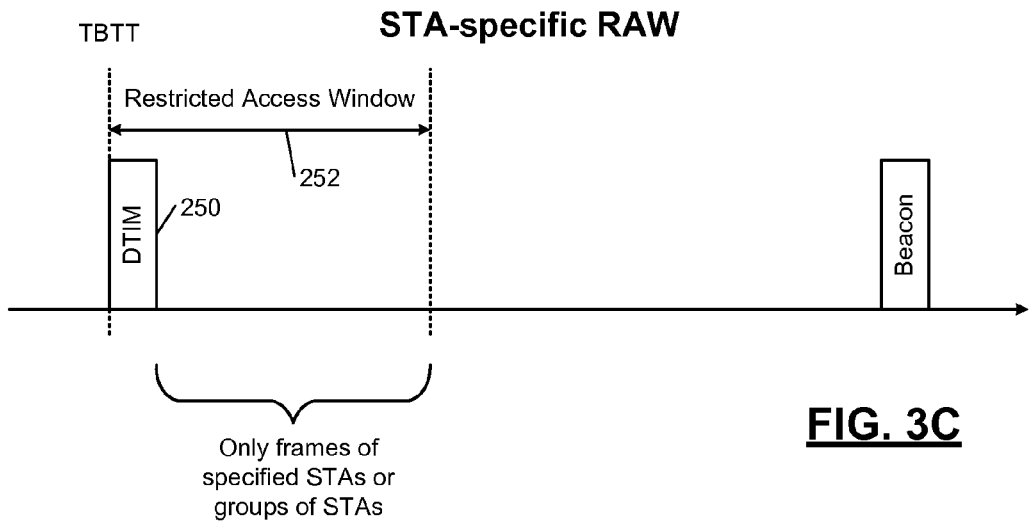

In FIG. 3C, a DTIM 250 announces a RAW 252 during which only specified stations or groups of stations may transmit frames. Upon conclusion of the RAW 252, all stations may be allowed to transmit.

FIGS. 4A-8B demonstrate RAWs during which all stations can transmit management and control frames, but generally only the AP can transmit data.

Figure 4A:
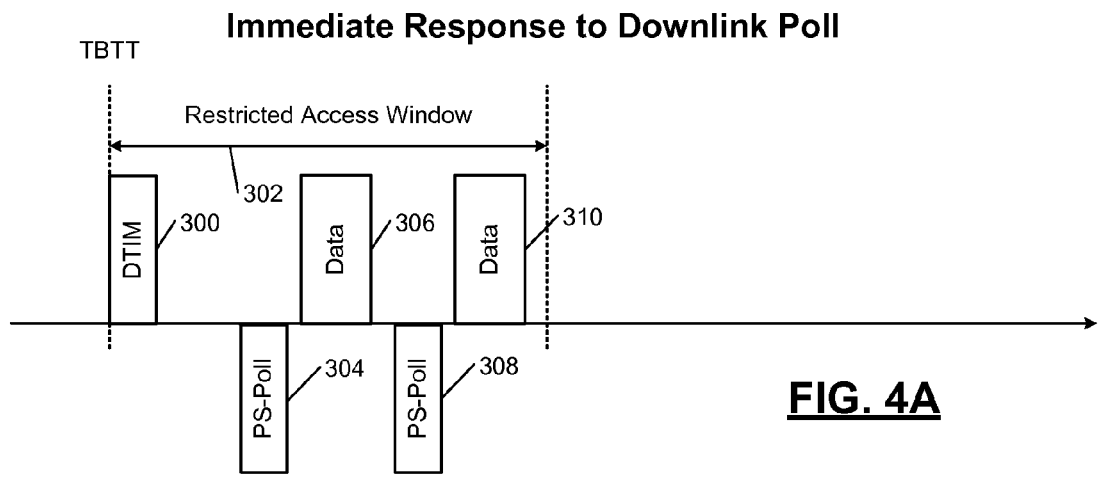

In FIG. 4A, a DTIM 300 announces a RAW 302, in which a station sends a power-saving poll (PS-Poll) frame 304, and the AP responds to the station with buffered data 306. The same station or another station sends a further poll frame 308, to which the AP responds with additional data 310. In various implementations, the station or stations that send the poll frames 304 and 308 may have been identified by AID in a partial virtual bitmap of the DTIM 300.

Figure 4B:
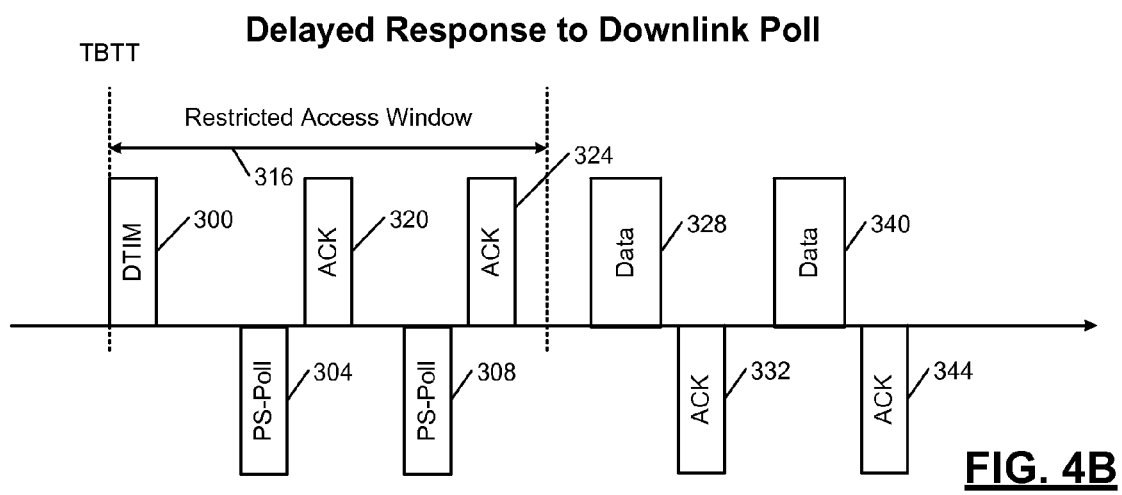

In FIG. 4B, the AP delays sending data in response to the poll frames until after a RAW 316. Numerals 300, 304, 308, and 310 will be reused in FIG. 4B for frames similar to those in FIG. 4A. In FIG. 4B, however, the AP does not respond to the poll frame 304 with data, but instead responds with an acknowledgment 320. The AP may respond with the acknowledgment 320 when the AP does not have the buffered data immediately available to send to the transmitter of the poll frame 304. Additionally or alternatively, the AP may not wish to occupy significant time during the RAW 316 with data transmissions.

The AP similarly responds with an acknowledgment 324 to the poll frame 308. After the RAW 316 ends, the AP sends data 328 to the sender of the poll frame 304, since the sender of the poll frame 304 indicated a willingness to receive that data and a willingness to remain in the awake mode until the data is received. The station responds to the data 328 with an acknowledgment 332. The AP also sends data 340 to the transmitter of the poll frame 308, which responds with acknowledgment 344.

Figure 4C:
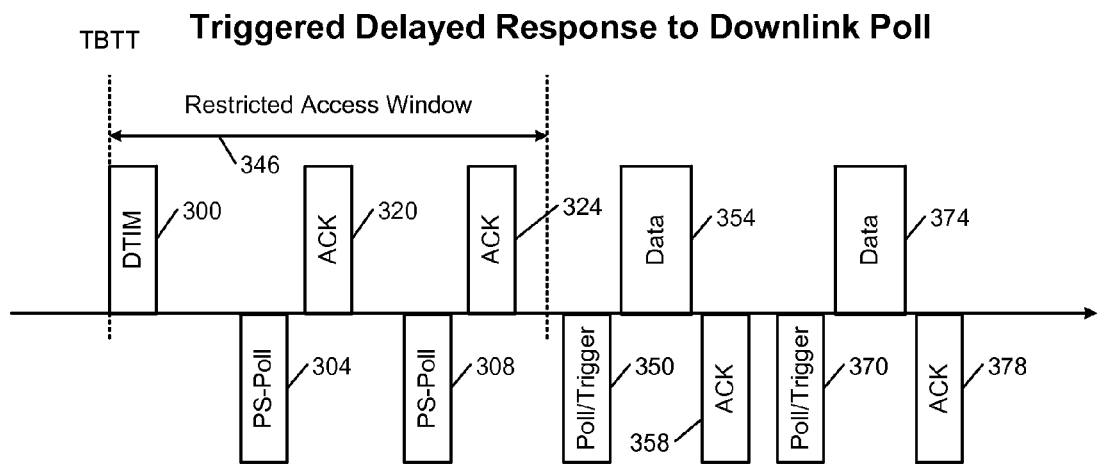

In FIG. 4C, operation of the AP during RAW 346 may be the same as or similar to operation during the RAW in FIG. 4B. In FIG. 4C, however, the transmitter of the poll frame 304 sends an explicit poll/trigger frame 350 to the AP, which responds with data 354, successful transmission of which is acknowledged at 358. Similarly, the sender of the poll frame 308 sends an explicit poll/trigger frame 370, to which the AP responds with data 374, successful transmission of which is acknowledged at 378.

Figure 5A:
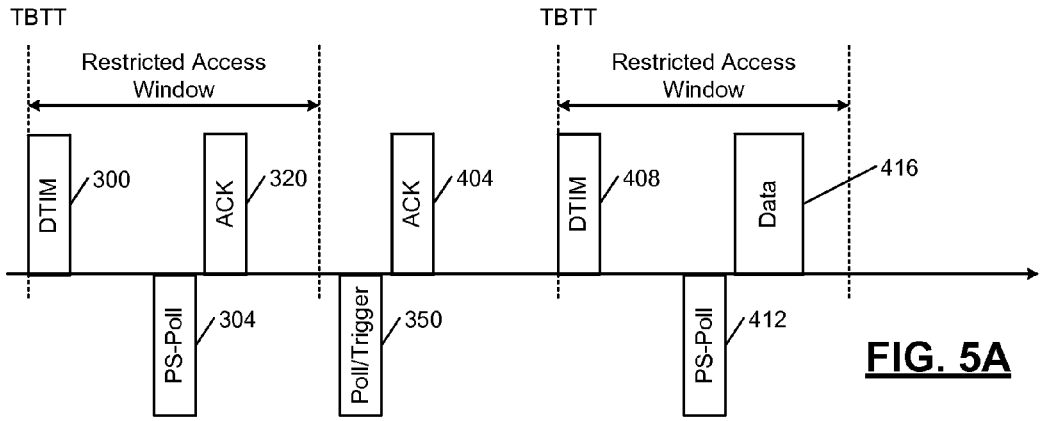

In FIG. 5A, a PS-Poll frame 304 may elicit an acknowledgment 320 from the AP, similar to the situation in FIG. 4C. After the RAW ends, the station sends a poll/trigger frame 350 to the AP. In this case, however, the AP responds with an acknowledgment 404. This may be the case when the AP has not had sufficient time to place the data in a hardware buffer and respond immediately to the poll/trigger frame 350. After a subsequent DTIM 408, which announces another RAW, the station may transmit a poll frame 412, to which the AP may respond immediately with data 416.

Figure 5B:
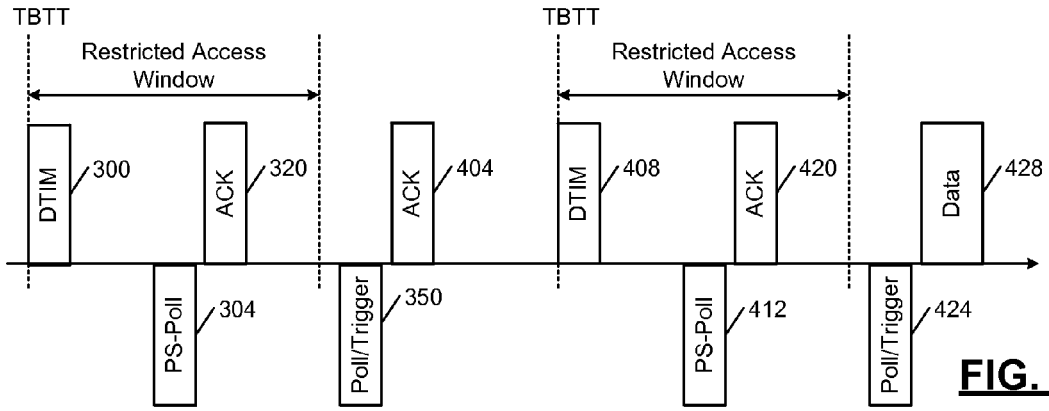

In FIG. 5B, numerals 300, 304, 320, 350, 404, 408, and 412 remain the same to identify frames similar to FIG. 5A. However, the AP may respond to the poll frame 412 with an acknowledgment 420 in cases where data is prohibited from being transmitted during the RAW or if the data is still not present in the AP's hardware buffer. After the second RAW concludes, the station sends a poll/trigger frame 424, to which the AP responds with data 428 if the data is ready.

Figure 5C:
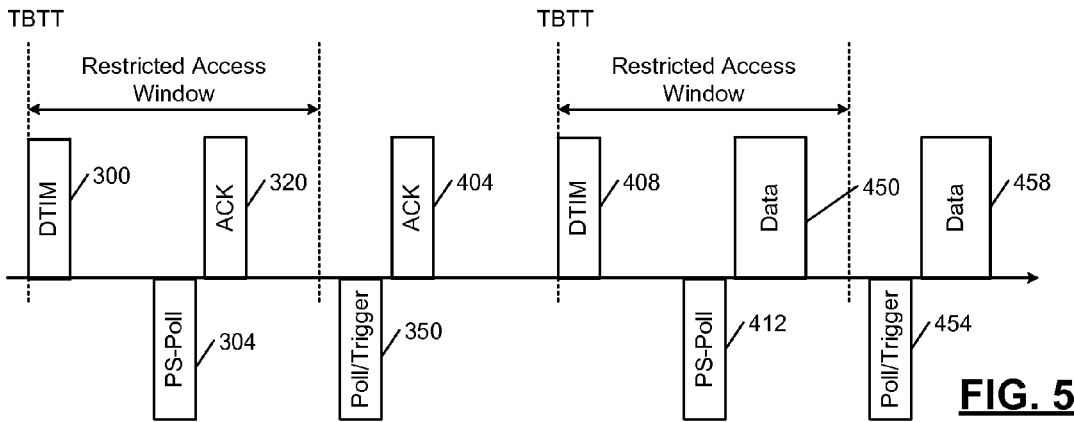

In FIG. 5C, numerals 300, 304, 320, 350, 404, 408, and 412 identify frames similar to FIG. 5A. In FIG. 5C, the AP responds to the poll frame 412 with data 450. The data 450 may be marked with a bit to indicate that additional data is forthcoming. For example, the AP can set the end of service period (EOSP) bit in the last frame of the data 450 indicating that the current data transmission is completed. However, the more data bit can be set to 1 in the last frame of the data 450 signifying to the station that, after waiting for a period of time, such as until after the RAW, the station should poll the AP again to receive the remaining or supplemental data. After the second RAW, the station sends an additional poll/trigger frame 454 to which the AP responds with supplemental data 458.

Supplemental data transmission may be used when the AP needs more time to buffer the additional data and/or when the AP needs to allow time for other transmissions to occur without waiting for the remainder of the data to be sent.

Figure 6A:
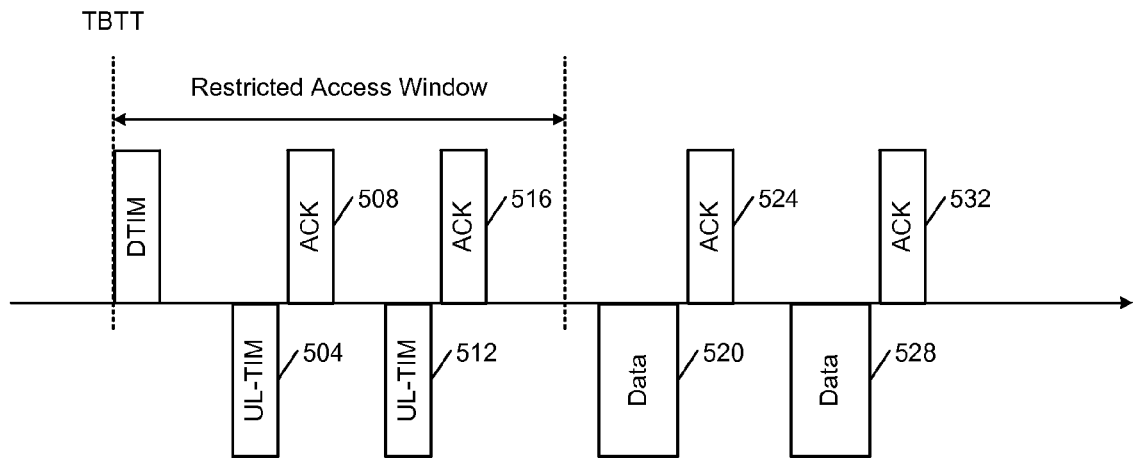

In FIG. 6A, a station transmits an uplink frame 504 to the AP. The AP responds with an acknowledgment 508 indicating that the AP is willing to accept the uplink data once the RAW has completed. Another station transmits a further uplink frame 512, which the AP may respond to with an acknowledgment 516. The sender of the uplink frame 504 may then transmit data 520 to the AP after the RAW has completed, successful transmission of which is acknowledged at 524. Similarly, the sender of the uplink frame 512 sends data 528 to the AP and receives acknowledgement 532 upon successful transmission.

Figure 6B:
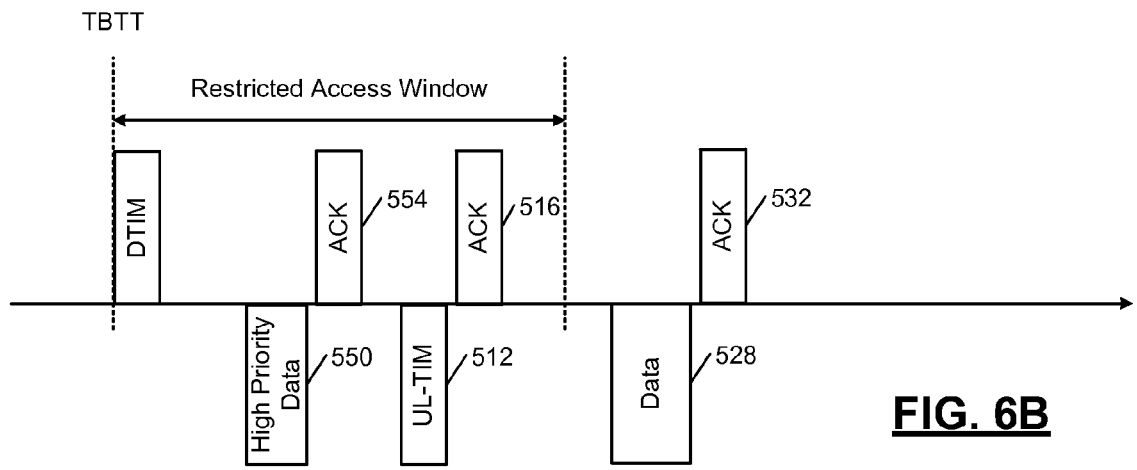

In FIG. 6B, the uplink frame 512 and the acknowledgment 516 may be the same as in FIG. 6A. In addition, high priority data 550 is transmitted to the AP without uplink indication or other previous negotiation. Assuming that the AP accepts this high priority data during a RAW, the AP responds with an acknowledgement 554. After the RAW is completed, the station that had sent the uplink frame 512 sends data 528, which is acknowledged at 532.

Figure 7A:
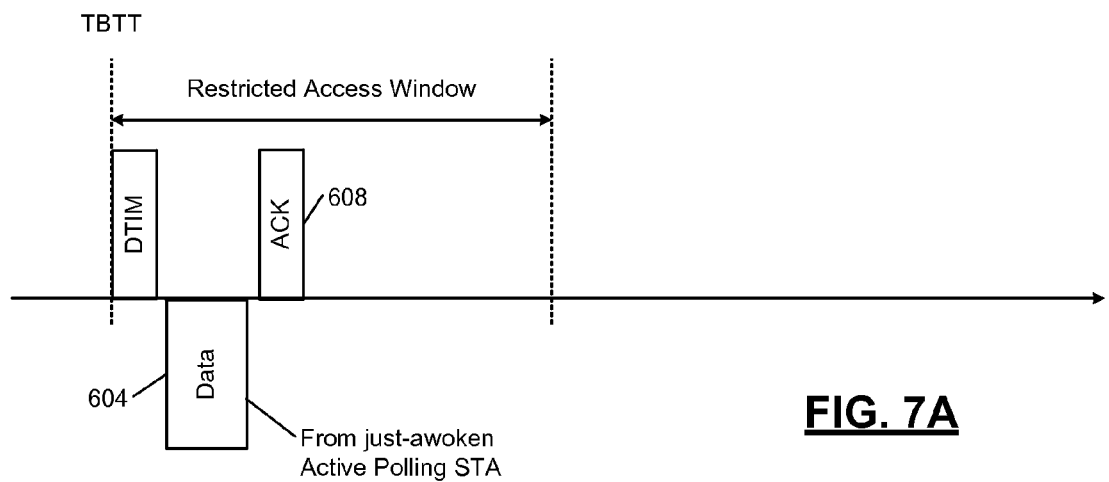

In FIG. 7A, an active polling station waking from a doze state may transmit data at any time subject to channel access restrictions. As a result, a standard data frame 604 may be sent in the middle of a RAW. The AP may recognize the nature of the active polling station, accept the data, and send an acknowledgment 608.

Figure 7B:
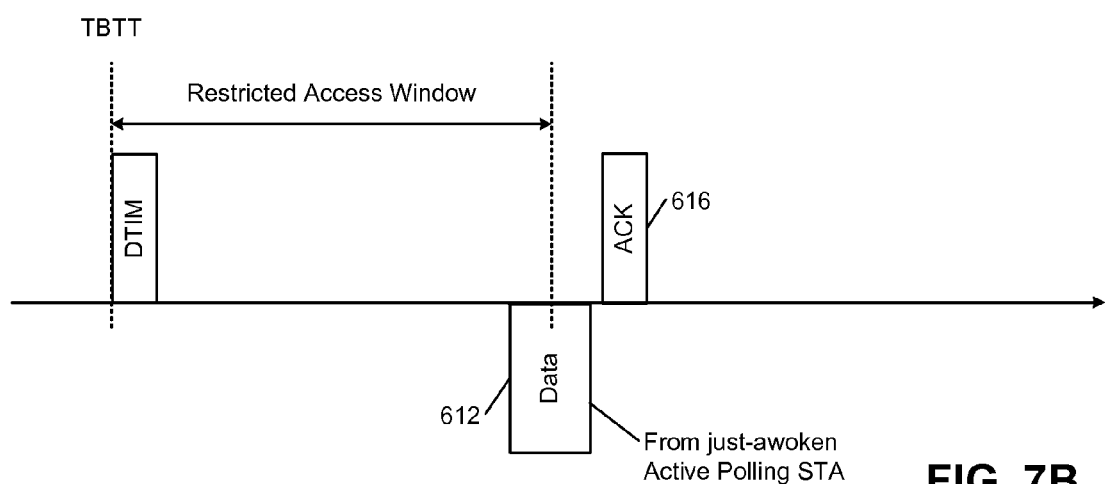

In FIG. 7B, note that because the active polling station is not synchronized with beacons or with designated RAWs, the active polling station may transmit a data frame 612 that overlaps the end of a RAW, as shown here, or could overlap the TBTT. The AP responds to successful transmission with an acknowledgment 616.

Figure 8A:
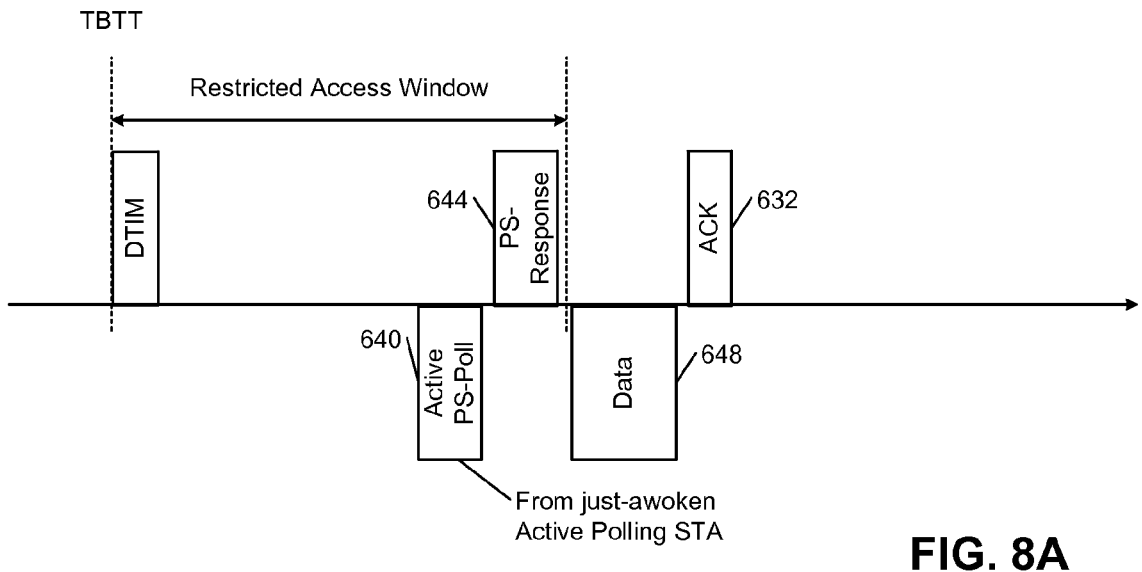

In FIG. 8A, an active polling station may transmit an active poll frame 640 instead of immediately beginning to send data. The AP responds with a PS-Response frame 644, which may tell the active polling station whether a RAW is currently active, when the RAW will end, and/or times of future beacons. The active polling station may note that the RAW is about to end based on the information in the response frame 644, and therefore the active polling station may transmit data 648 after the end of the RAW. The AP sends an acknowledgement 652 to acknowledge successful transmission.

Figure 8B:
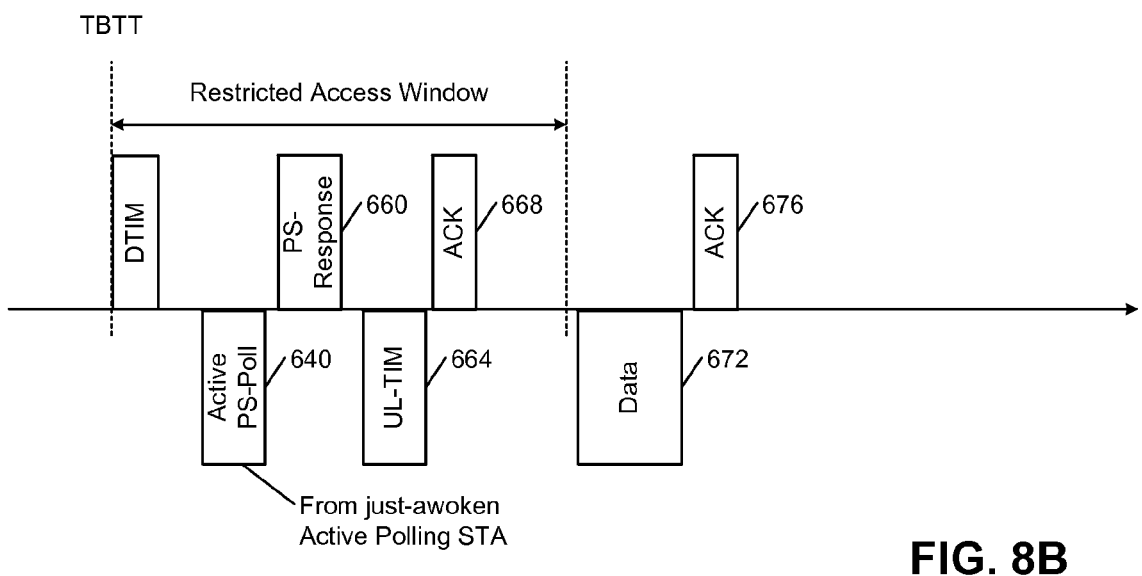

In FIG. 8B, the active polling station transmits an active poll frame 640. In this case, the AP's response frame 660 may indicate that there is time within the RAW for the active polling station to negotiate uplink transmissions. The power-saving station may therefore transmit an uplink frame 664, which is acknowledged by the AP at 668. Following the RAW, the active polling station transmits data 672 corresponding to the uplink frame 664, successful transmission of which is acknowledged at 676.

Figure 9A:
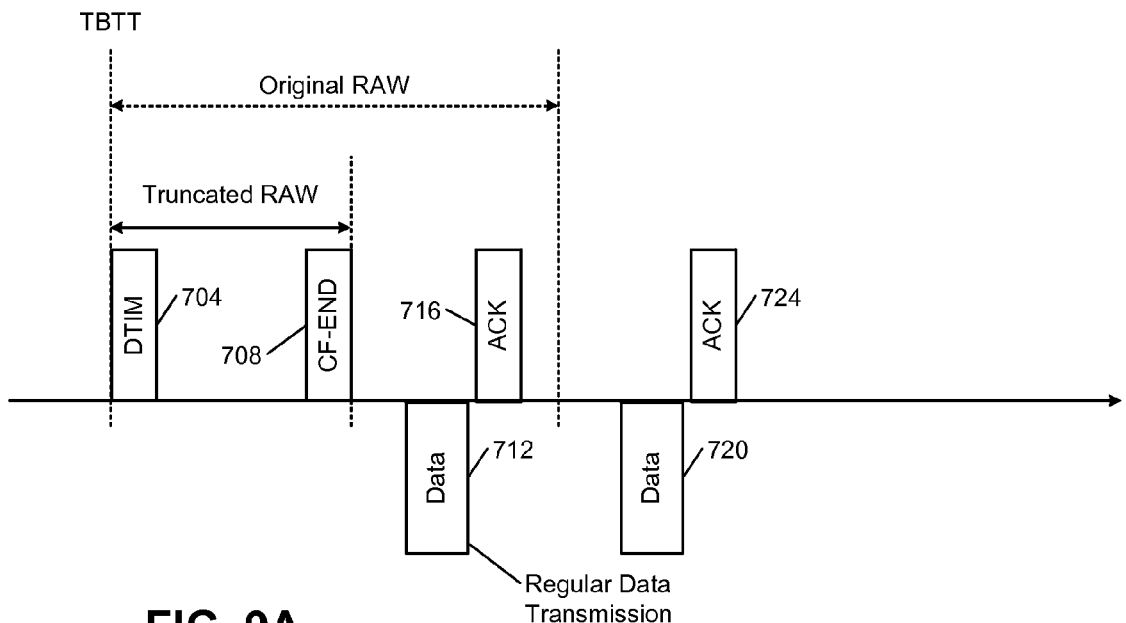

In FIG. 9A, a DTIM 704 announces a RAW, labeled as an original RAW in FIG. 9A. The AP may prematurely end the RAW, such as by sending a CF-END frame 708. The AP may truncate the RAW if no frames are being sent during the RAW and/or a predetermined period of time, such as a minimum backoff period, has expired without any frames being transmitted. By truncating the RAW, regular data transmission, such as data 712, acknowledged at 716, can be transmitted.

Once the original RAW ends, other stations that may not have been monitoring for the CF-END frame 708 will be able to send regular data, such as data 720, acknowledged at 724. In other words, stations that recognize the CF-END frame 708 may use the remainder of the original RAW to perform transmissions not allowed by the RAW, such as transmitting regular data.

Figure 9B:
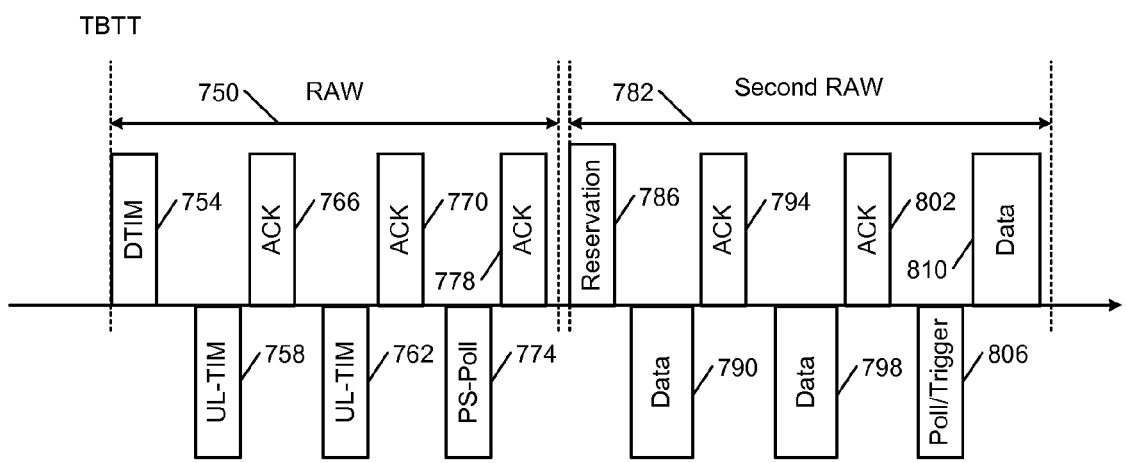

In FIG. 9B, a RAW 750 is initiated by a DTIM 754. Uplink frames 758 and 762 are acknowledged at 766 and 770, respectively. A poll frame 774 is acknowledged at 778. The AP may recognize that the RAW 750 was relatively busy and may therefore dynamically schedule a second RAW 782. The AP may schedule the second RAW 782 using a reservation frame 786.

The second RAW 782 can be used to service the uplink and poll requests made during the RAW 750. For example, data 790 corresponding to the uplink frame 758 may be transmitted to the AP and acknowledged at 794. Data 798 corresponding to the uplink frame 762 may be transmitted to the AP and acknowledged at 802. Similarly, a poll/trigger frame 806 corresponding to the poll frame 774 is transmitted to the AP, which responds with data 810. In other implementations or situations, the second RAW 782 may instead be used to allow stations to send additional poll frames and uplink indication frames to the AP.

Figure 10A:
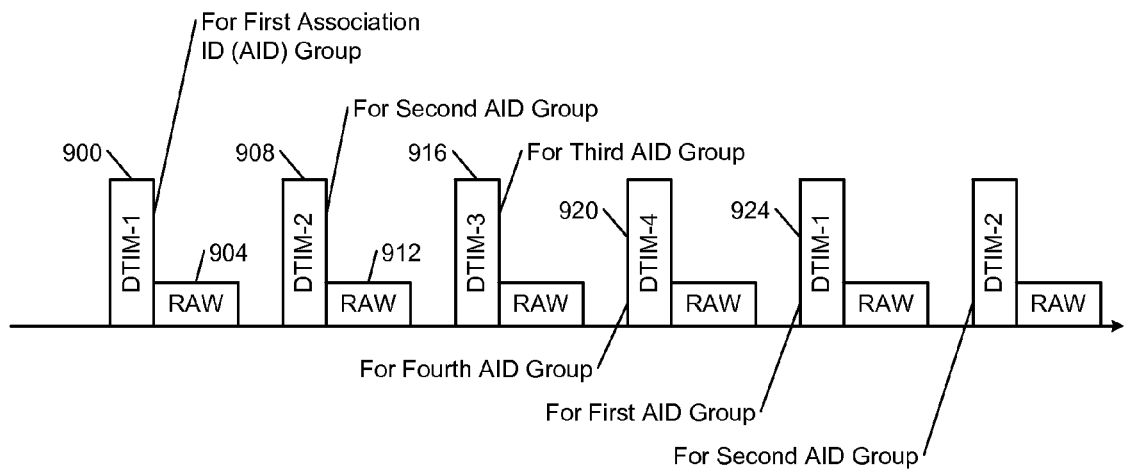

In FIG. 10A, dedicated DTIMs are shown. In other words, each DTIM may be dedicated to a certain group of stations, which may be organized by their association identifier (AID). For example, all of the AIDS in a BSS may be split into four groups, with each group having a corresponding DTIM. In this example, the two most significant bits of a station AID may indicate which of the four groups the station belongs to. Further discussion of AID grouping is found in commonly assigned U.S. patent application Ser. No. 13/477,575, filed May 22, 2012 and titled "Downlink and Uplink Staggering Techniques with AID Bitmap Segmentation", the entire disclosure of which is here incorporated by reference.

In FIG. 10A, a first DTIM 900 corresponds to a first group of stations, such as the first AID group. A RAW 904 following the first DTIM 900 is restricted to those stations belonging to the first AID group. Similarly, a second DTIM 908 corresponds to a second AID group and a following RAW 912 is restricted to stations belonging to the second AID group. After third and fourth DTIMs 916 and 920, the cycle repeats, with another first DTIM 924 being sent.

By splitting the RAWs into station groups, contention for the medium is reduced. In addition, the stations may be grouped based on functionality. For example, one group of stations may be very power-sensitive with only intermittent transmissions, while another group of stations may have high throughput. Without splitting up the stations into separate RAWs, the stations having high throughput would contend with, and might crowd out or at least delay, the transmissions of the power-sensitive stations, increasing the power drain of the power-sensitive stations.

Figure 10B:
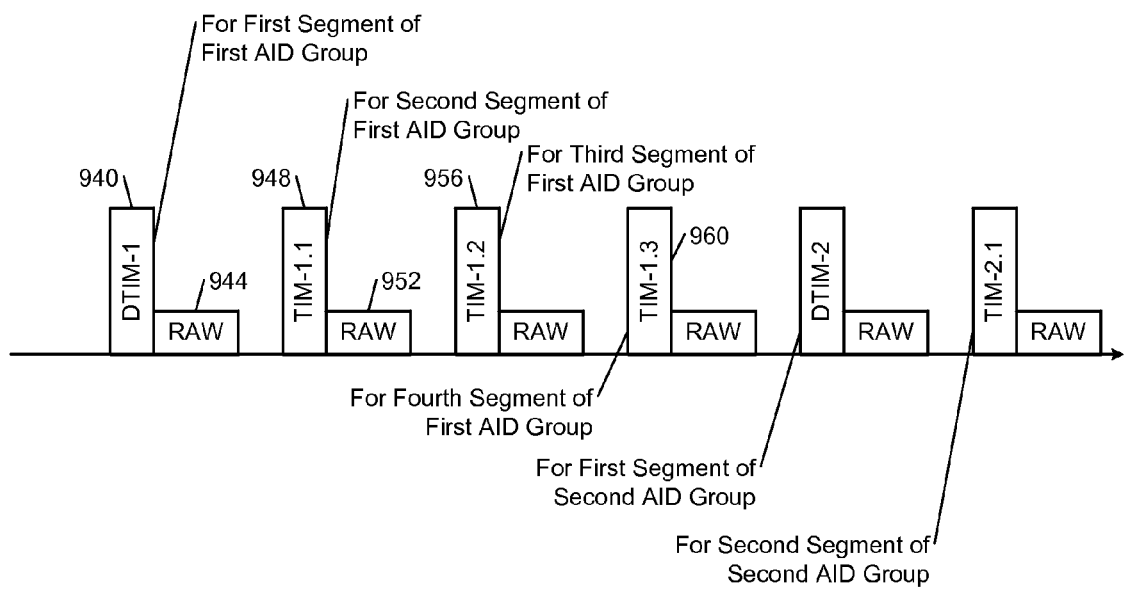

In FIG. 10B, the group DTIMs are further segmented. For example, the first DTIM 900 is segmented into a DTIM 940 corresponding to a first segment, with a subsequent RAW 944 during which only a first segment of the first AID group is allowed to transmit. The DTIM 940 is followed by a TIM 948 corresponding to a second segment of the first AID group, where a subsequent RAW 952 is restricted to only those stations in the second segment of the first AID group.

Similarly, a TIM 956 corresponds to a third segment of the first AID group and a TIM 960 corresponds to a fourth segment of the first AID group. The remaining DTIM groups may also be segmented in this manner or may be left unsegmented if the AP determines that those groups do not need to be further segmented. For example, when a smaller number of stations is active within an AID group, even if the total number of stations in the AID group is large, that AID group may not need to be segmented.

Figure 11A:
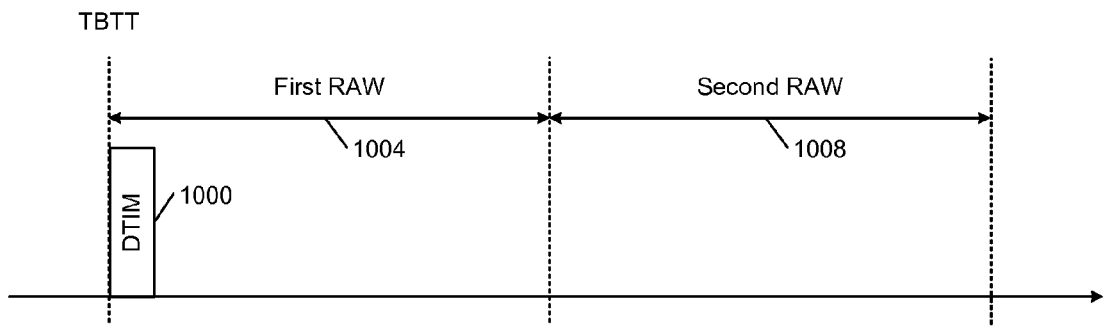
Figure 11B:

In FIG. 11A, a DTIM 1000 announces a first RAW 1004 and a second RAW 1008. The first and second RAWs 1004 and 1008 do not need to be contiguous. For example, in FIG.

11B, a DTIM 1020 announces a first RAW 1024 and a second RAW 1028 separated in time from the first RAW 1024.

Figure 12A:
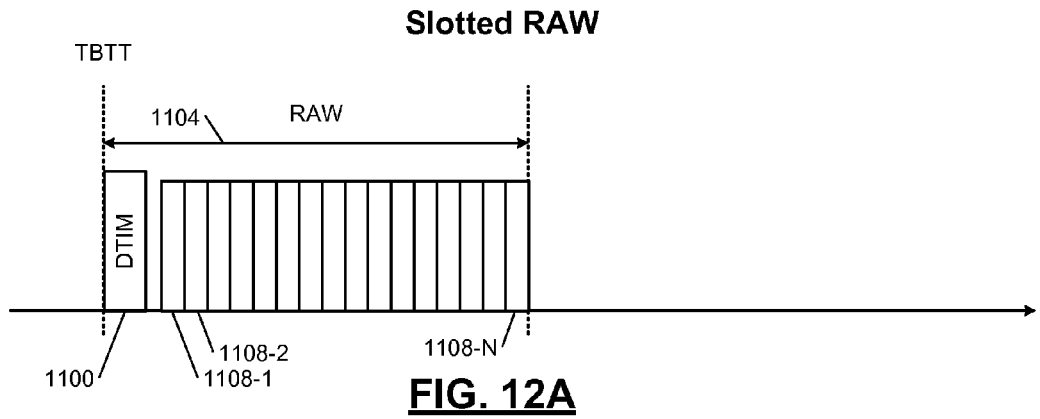

In FIG. 12A, a DTIM 1100 announces a slotted RAW 1104 including N slots 1108-1, 1108-2, . . . 1108-N (collectively, "slots 1108"). Each of the slots 1108 may be assigned to one or more stations or may be left unassigned. For example, stations identified in the partial virtual bitmap (PVB) of the DTIM 1100 may be assigned to the slots 1108.

For example, the stations may be assigned to the slots 1108 based on the order in which the one bits are present in the PVB. In other words, the station having the lowest AID identified with a one in the PVB may be assigned to slot 1108-1, while the station having the next lowest AID identified with a one in the PVB will be assigned to slot 1108-2. The AP may be configured to assign multiple stations to a single one of the slots 1108 and/or may be configured to assign a single station to multiple of the slots 1108.

Stations that are not assigned one of the slots 1108 may select an unassigned one of the slots 1108 for uplink access. For example only, each unassigned STA may randomly select one of the unassigned ones of the slots 1108 for uplink access.

Stations with assigned or selected time slots can start channel access immediately at the beginning of the corresponding slot, subject to minimal channel constraints—specifically, the distributed coordination function (DCF) interframe space (DIFS) or, for stations recognizing QoS, the arbitration interframe space (AIFS). In situations where the station cannot obtain access to the time slot because the channel is busy, the station may contend for later time slots.

Once a station begins transmitting, the station may continue to transmit data and other frames so long as the transmissions do not exceed the end of the slot or slots assigned to the station. The AP, on the other hand, may be allowed to extend a transmission beyond the end of a slot. When selecting the length of the slots, the AP may limit their length to allow only very short frames with little or no data to be transmitted by the stations.

Figure 12B:
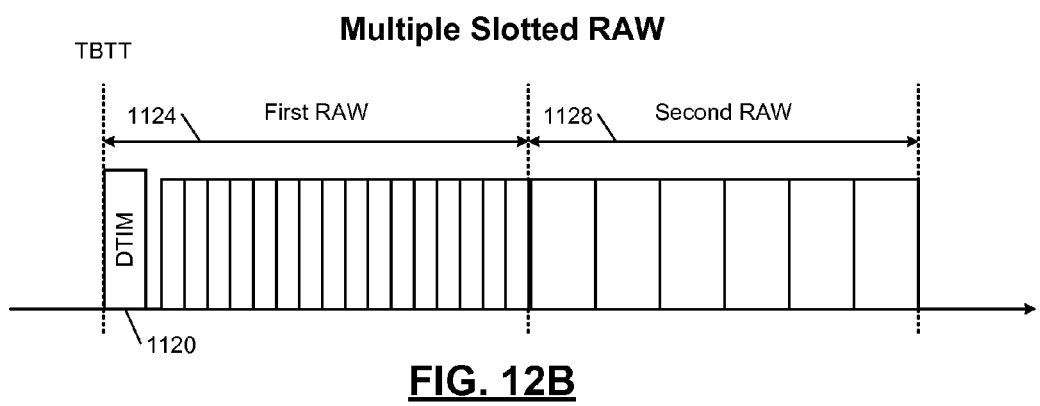

In FIG. 12B, a DTIM 1120 announces a first RAW 1124 and a second RAW 1128. During the first RAW 1124, the slots are shorter, thereby limiting the length and type of frame that a station can send. During the second RAW 1128, each slot may be longer, long enough to allow a longest physical layer convergence procedure (PLCP) protocol data unit (PPDU) to be transmitted and an immediate response to be received. During the first RAW 1124, the AP may direct that certain channel access parameters are modified in order to achieve quality of service for various frames. For example only, poll frames and uplink frames may get higher priority by using shorter backoff parameters to access the channel.

Figure 12C:
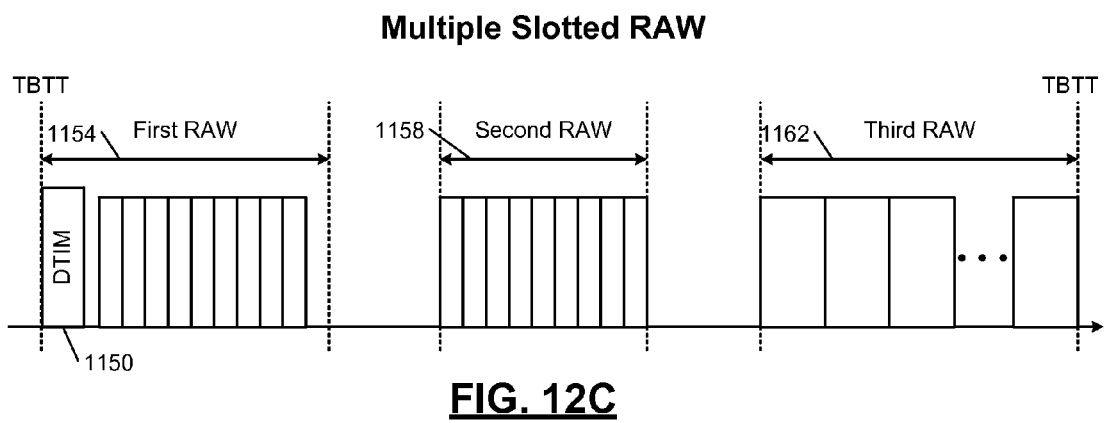

In FIG. 12C, a DTIM 1150 announces a first RAW 1154, a second RAW 1158, and a third RAW 1162. The second RAW 1158 may give stations more opportunities to transmit short frames. In addition, if the first RAW 1154 is interfered with by an overlapping BSS (OBSS), transmissions may be more successful during the second RAW 1158. In various implementations, the AP may allow a period of time between the first RAW 1154 and the second RAW 1158 so that the AP can downlink cached data, thereby emptying its buffers and allowing the AP to then buffer data to service poll requests during the second RAW 1158.

Although the DTIM 1150 announces all three of the RAWs 1154, 1158, and 1162 in FIG. 12B, the AP could instead dynamically announce RAWs with a frame such as a reservation frame. The AP may transmit the DTIM and any additional reservation frame in a 1 MHz/2 MHz duplicated mode to be sure to reserve all relevant 1 MHz and 2 MHz channels. For additional discussion of interaction between 1 MHz and 2 MHz PHYs, see commonly assigned application Ser. No. 13/680,831, filed Nov. 19, 2012 and titled "802.11 Enhanced Distributed Channel Access" (MP4421), the entire disclosure of which is here incorporated by reference.

Figure 13:
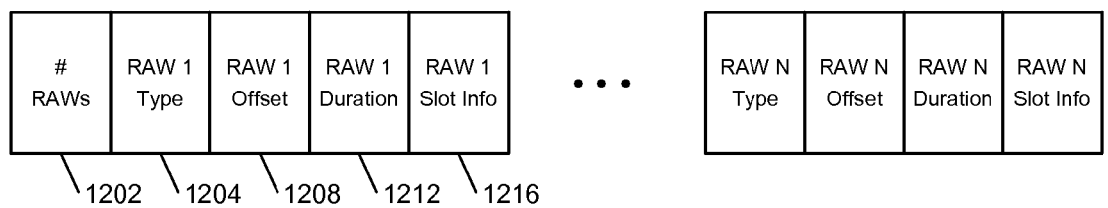
FIG. 13 is a graphical indication of a restricted access window information element.

In FIG. 13, an example RAW information element 1200, which may be transmitted in a DTIM, is shown. The RAW information element includes a number field 1202 indicating the number of RAWs announced by the RAW information element 1200. The total length of the RAW information element may be calculated based on the number field 1202.

For the first RAW of the RAW information element 1200, a type field 1204 specifies, for example, what form of communication is allowed during the first RAW. For example only, the type field 1204 may specify what types of frames may be transmitted, or may specify which groups of stations may transmit. The type field 1204 may also indicate other constraints of the RAW, such as channel access parameters or channel bandwidths.

An offset field 1208 specifies when the first RAW begins with respect to a predetermined reference point. The predetermined reference point may be the beginning of the DTIM including the RAW information element 1200, the end of the DTIM, or some other suitable measuring point such as the TBTT. A duration field 1212 specifies a length the first RAW; the end of the RAW may be calculated by adding the duration to the offset. In other implementations, the duration field 1212 may be replaced with an ending offset field.

A slot info field 1216 specifies whether the first RAW is divided into slots and may further specify the number of slots and which stations are assigned to each slot. Although depicted as having equal widths, the fields 1202, 1204, 1208, 1212, and 1216 may each have different lengths. For example, when the slot info field 1216 indicates assignment of stations to slots, the slot info field 1216 may be significantly longer than the other fields. The RAW fields are repeated for each RAW up to the total number N of RAWs, where N is specified by the number field 1202.

Figure 14:
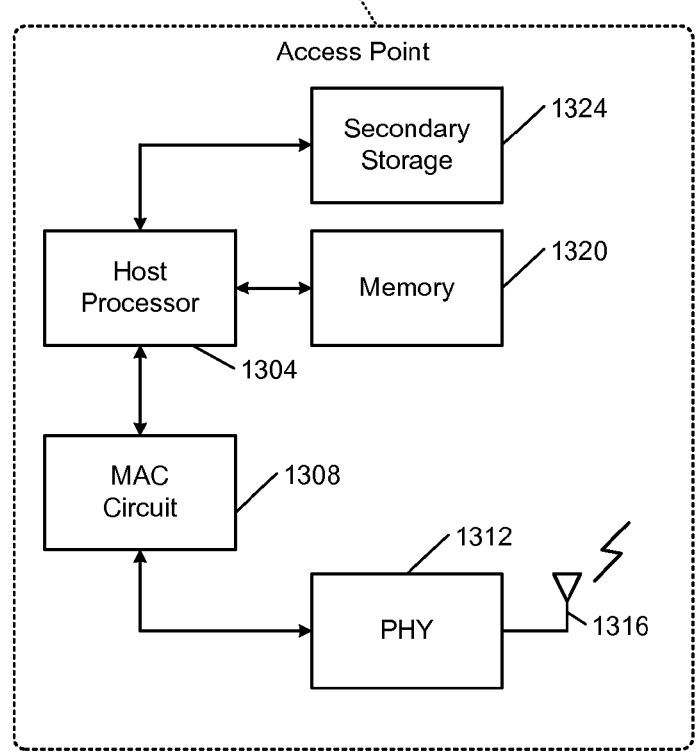
FIG. 14 is a block diagram of an example access point.

In FIG. 14, an access point 1300 includes a host processor 1304, which provides data to and receives data from a medium access control (MAC) circuit 1308. The MAC circuit 1308 interfaces with a wireless medium via a physical layer device (PHY) 1312 and an antenna 1316. The host processor 1304 may store data, such as cached frames for stations in the BSS of the access point 1300 in a memory 1320.

Secondary storage 1324 may include instructions, parameters, and firmware for execution by the host processor 1304. In addition, the secondary storage 1324 may backup the memory 1320, which may be volatile. In addition, when a large amount of data is cached, some of that data may be stored to the secondary storage 1324. This may increase the amount of time it takes to access that data and provide data to the MAC circuit 1308.

Figure 15:
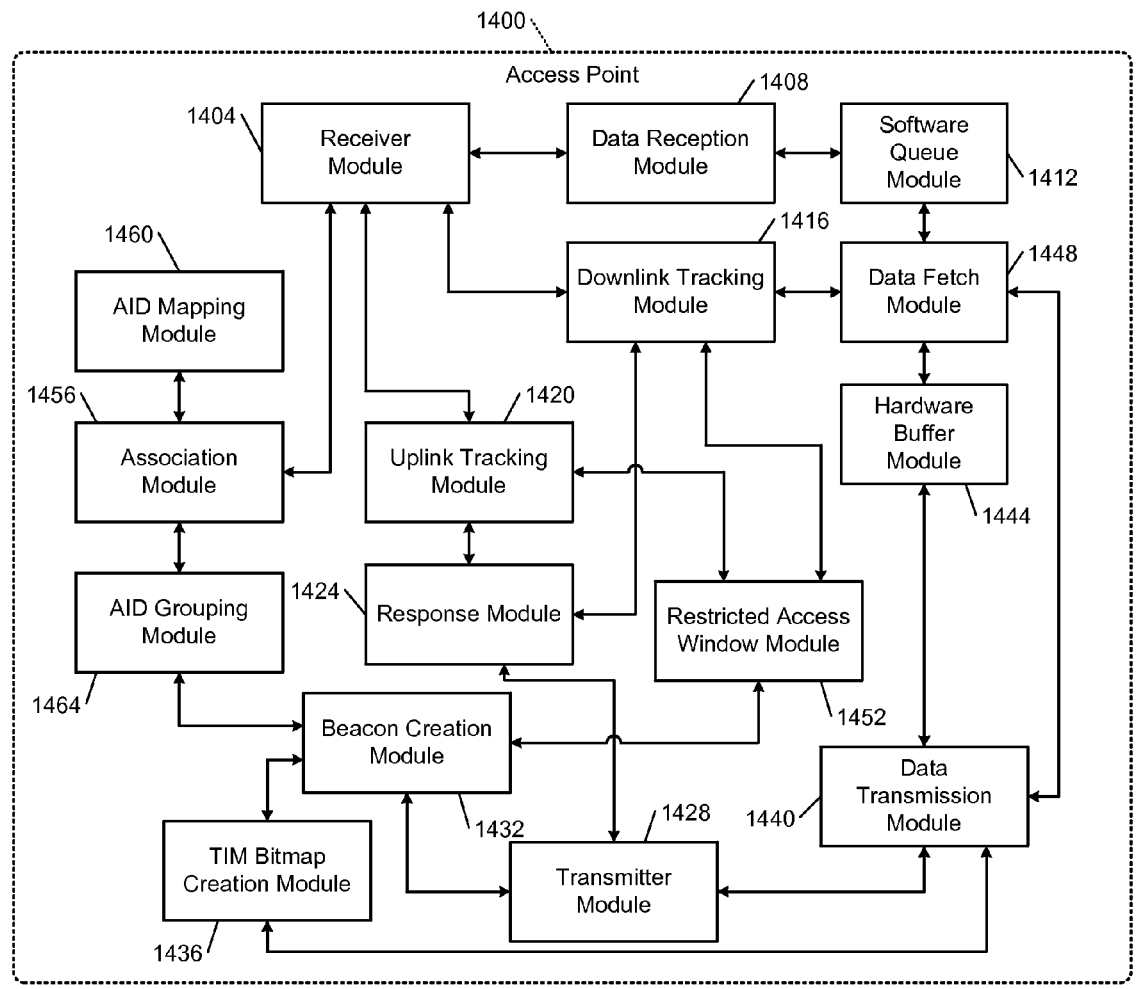
FIG. 15 is a functional block diagram of an example access point.

In FIG. 15, a functional block diagram of an access point 1400 is shown. A receiver module 1404 receives frames from stations in the BSS. The receiver module 1404 provides data to a data reception module 1408, which then sends the data frames to a software queue module 1412. The receiver module 1404 provides downlink-related frames a downlink tracking module 1416, and provides uplink-related frames to an uplink tracking module 1420. A response module 1424 determines appropriate responses to uplink and downlink frames and provides appropriate responses to a transmitter module 1428, which transmits those responses to stations in the BSS.

A beacon creation module 1432 creates beacons for transmission by the transmitter module 1428. The beacon creation module 1432 may rely on a TIM bitmap creation module 1436, which creates, for example a partial virtual bitmap of stations to which data needs to be transmitted, as indicated by a data transmission module 1440. The data transmission module 1440 also provides data from a hardware buffer module 1444 to the transmitter module 1428 for transmission.

The downlink tracking module 1416 may be responsible for actuating a data fetch module 1448 in response to a downlink message, such as a PS-Poll. The data fetch module 1448 retrieves queued frames from the software queue module 1412 and provides those frames to the hardware buffer module 1444. A restricted access window module 1452 determines whether a restricted access window is necessary or desirable. If so, the restricted access window module 1452 instructs the beacon creation module 1432 to announce a restricted access window.

When stations associate with the access point 1400, an association module 1456 maps a unique identifier of the station to an association identifier (AID) in an AID mapping module 1460. For example, the AID mapping module 1460 may map MAC addresses to AIDs. The association module 1456 may also interact with an AID grouping module 1464, which determines which AID group the station should belong to. In various implementations, the group determined by the AID grouping module 1464 will determine which AID is assigned to the station. The restricted access window module 1452 may determine the desirability of a restricted access window based on reception of uplink and downlink information from the uplink tracking module 1420 and the downlink tracking module 1416.

Figure 16:
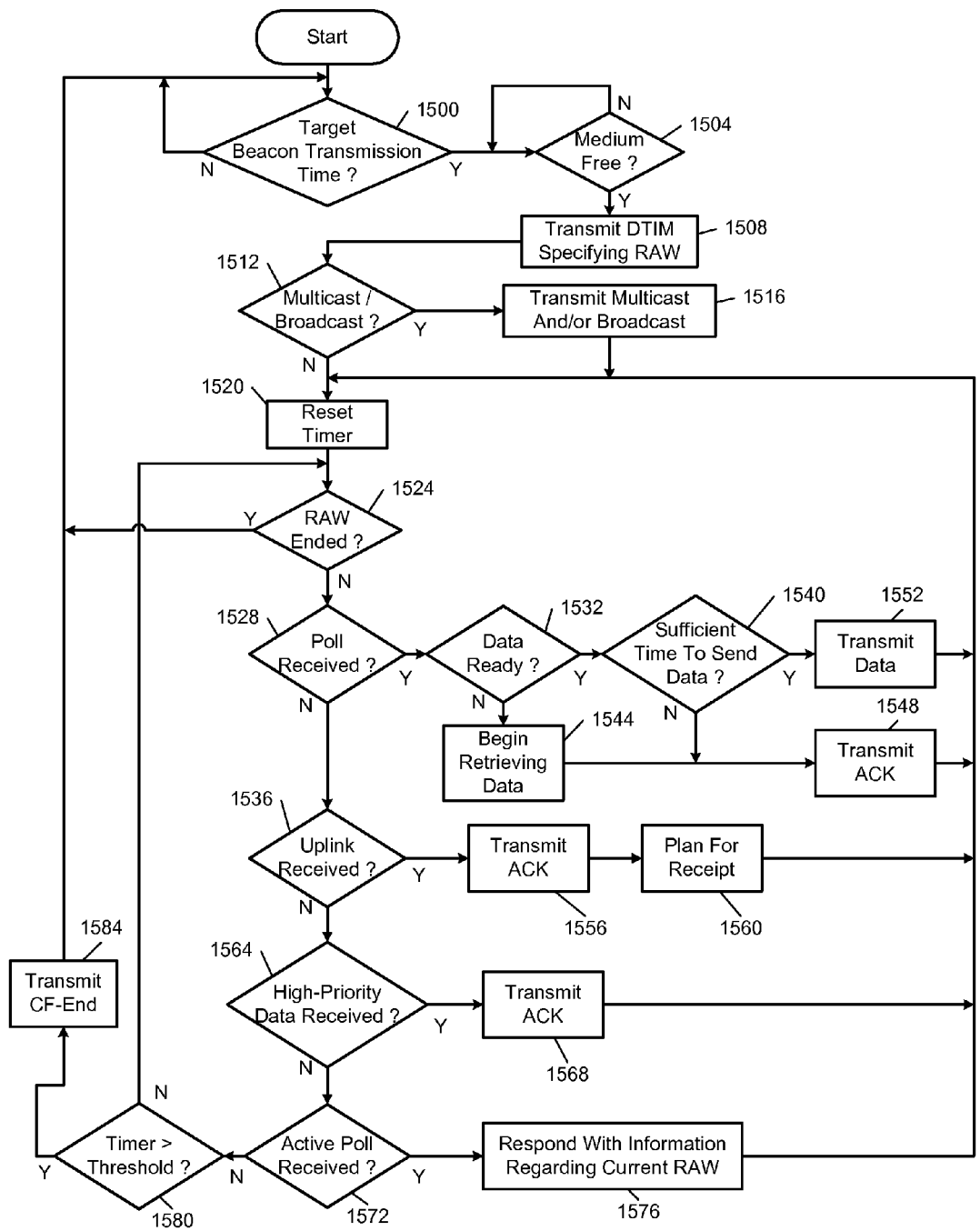
FIG. 16 is a flowchart depicting example operation of an access point.

In FIG. 16, example operation of an access point when creating a slotted RAW is shown. Control starts at 1500, where control determines whether a target beacon transmission time has arrived. If so, control transfers to 1504; otherwise, control remains at 1500. Controls remains at 1504 until the wireless medium is free, at which point control transfers to 1508.

At 1508, control transmits a DTIM beacon, which may announce one of more RAWs. In this example, the DTIM announces a single RAW. Control continues at 1512, where if multicast or broadcast data is queued, control transfers to 1516; otherwise, control transfers to 1520. At 1516, control transmits the multicast and/or broadcast data on to the wireless medium and continues to 1520. At 1520, a timer is reset. The timer keeps track of how long it has been since a frame was received during the RAW, which may be used by the AP to determine whether to terminate the RAW early.

Control continues at 1524, where if the RAW has ended, control returns to 1500; otherwise, control continues at 1528. At 1528, control determines whether a poll frame has been received. If so, control transfers to 1532; otherwise, control continues at 1536. At 1532, control determines whether data corresponding to the poll frame is ready. If so, control transfers to 1540; otherwise, control transfers to 1544. At 1544, the data was not ready and so the AP begins retrieving the data for later transmission. Control then transfers to 1548, where an acknowledgment is transmitted in response to the poll frame, and control returns to 1520.

At 1540, control determines whether there is sufficient time within this RAW to send the requested data. If so, control transfers to 1552, where the data is transmitted and control returns to 1520. Otherwise, control transfers to 1548, where the acknowledgment only is transmitted.

At 1536, control determines whether an uplink frame has been received. If so, control transfers to 1556, where an acknowledgment is transmitted. At 1560, control plans for the eventual receipt of the data indicated by the uplink. For example only, this may mean reserving a slot in a future RAW or increasing the likelihood of an additional RAW being specified. Control then returns to 1520. If an uplink frame is not received at 1536, control continues at 1564, where control determines if high priority data has been received. If so, control transfers to 1568; otherwise, control transfers to 1572. At 1568, control transmits an acknowledgment in response to the high priority data and returns to 1520.

At 1572, control determines whether an active poll frame has been received. If so, control transfers to 1576; otherwise, control transfers to 1580. At 1576, control responds with a frame carrying information regarding the current RAW, including what transmissions are allowed and when the current RAW will end. Control then returns to 1520. At 1580, control determines whether the timer is greater than a predetermined threshold. If so, control transfers to 1584, where a CF-END frame is transmitted, thereby ending the RAW. Control then returns to 1500 to wait for the next target beacon transmission time. If the timer is not greater than the threshold at 1580, control returns to 1524 to check for additional frames.

Figure 17:
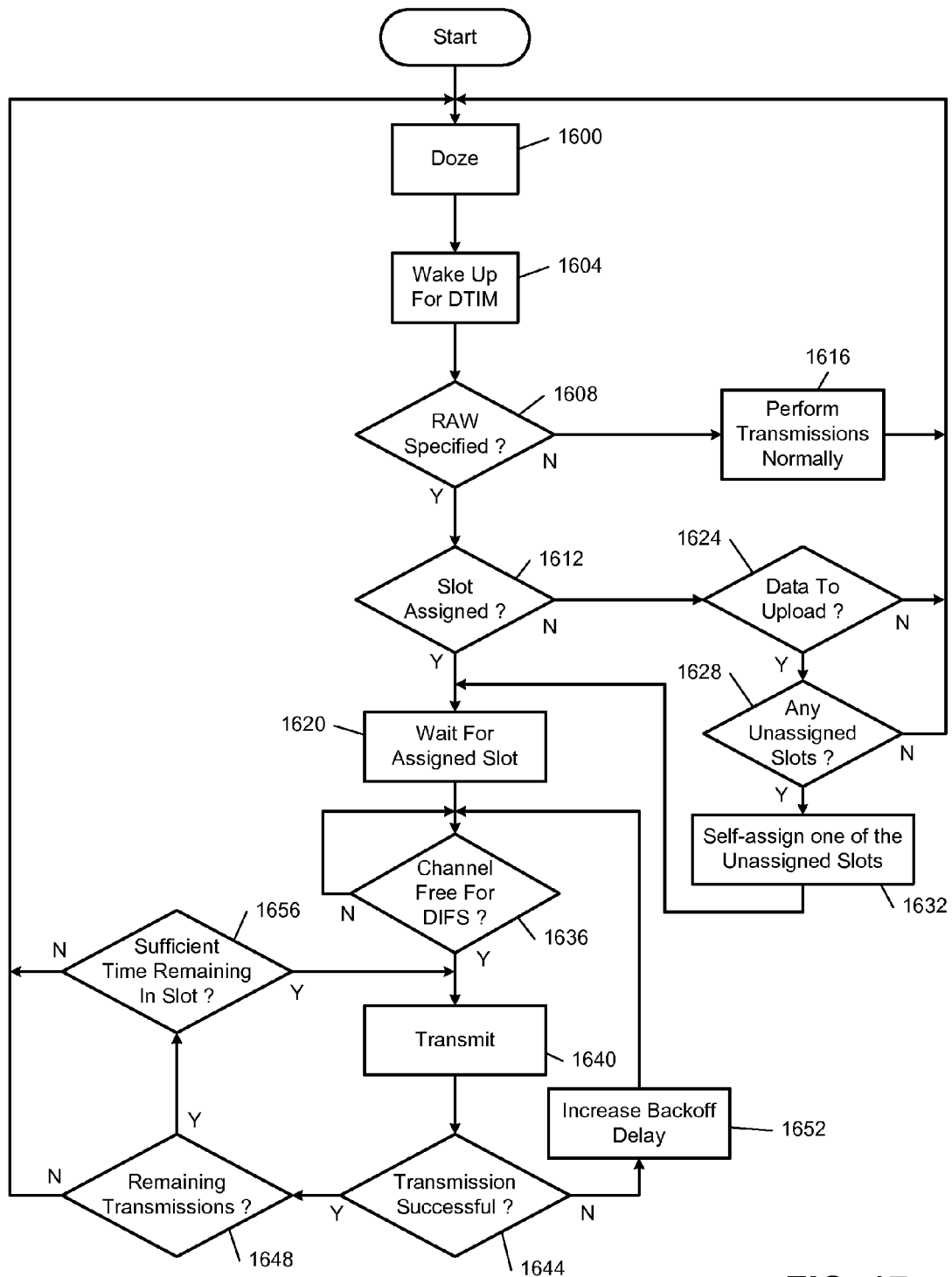
FIG. 17 is a flowchart depicting example operation of a station.

In FIG. 17, example operation of a power-saving station is presented. Control starts at 1600, where the station enters a doze state. At 1604, control wakes up in time for the next DTIM. At 1608, control determines whether a RAW was announced in the DTIM. If so, control transfers to 1612; otherwise, control transfers to 1616. At 1616, control performs transmissions normally based on whether the station has any frames to uplink or whether the partial virtual bitmap in the DTIM indicated that buffered frames are available for the station. Control then returns to 1600 to return to the doze power-saving state.

At 1612, control determines whether a slot within the RAW has been assigned to the station. If so, control transfers to 1620; otherwise, control transfers to 1624. At 1624, control determines whether there is data to upload to the AP. If not, control returns to 1600; otherwise, control transfers to 1628 and determines whether there are any unassigned slots in the RAW. If there are unassigned slots, control transfers to 1632; otherwise, control returns to 1600. At 1632, control self-assigns one of the unassigned slots to the station and control continues at 1620.

Control waits in 1620 for the assigned slot before continuing at 1636. Control verifies that the channel has been free for at least a period equal to DIFS (or the AIFS appropriate to the data's access category). Once the channel has been free for this period of time, control transfers to 1640. At 1640, control attempts to transmit either a poll frame, to receive data from the access point, or a data frame. At 1644, if the transmission is successful, control transfers to 1648; otherwise, control transfers to 1652.

At 1652, control increases backoff delay because the transmission was unsuccessful and control returns to 1636. At 1648, control determines whether the station has any remaining transmissions, such as additional uplink data or additional poll frames to receive downlink data. If so, control transfers to 1656; otherwise, control returns to 1600. At 1656, control determines whether there is sufficient time remaining in the slot to perform further transmissions. If so, control transfers to 1640; otherwise, control returns to 1600.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The invention claimed is:

1. An access point comprising:
a restricted access window module configured to define a restricted access window during which stations that belong to a same infrastructure basic service set as the access point are not allowed to transmit data frames;
a beacon creation module configured to generate a beacon announcing the restricted access window, wherein the restricted access window is contained within a following beacon interval;
a transmitter module configured to transmit the beacon to the stations that belong to the same infrastructure basic service set as the access point, wherein the following beacon interval begins upon transmission of the beacon and ends upon transmission of a second beacon, wherein the transmitter module is configured to transmit the second beacon subsequent to the beacon without transmitting any intervening beacons;
a downlink tracking module configured to, during the restricted access window, receive a poll frame from a first station of the stations that belong to the same infrastructure basic service set as the access point; and
a data transmission module configured to, subsequent to the poll frame, transmit a data frame to the first station, wherein the beacon includes a delivery traffic indication map and includes an indication that the data frame is queued for transmission to the first station,
wherein during the restricted access window, the stations that belong to the same infrastructure basic service set as the access point are permitted to transmit frames having a first value of a transmission characteristic, and
wherein during a second restricted access window, the stations that belong to the same infrastructure basic service set as the access point are permitted to transmit frames having a second value of the transmission characteristic.

2. The access point of claim 1, wherein:
the beacon creation module is configured to transmit, at a periodic interval, beacons including the delivery traffic indication map,
an active polling station is configured to wake up at intervals greater than the periodic interval, and
the access point is configured to allow the active polling station to transmit data frames during the restricted access window.

3. The access point of claim 1, wherein the restricted access window begins at a conclusion of transmission of the beacon.

4. The access point of claim 1, wherein:
the data transmission module is configured to selectively transmit at least one of multicast data and broadcast data upon conclusion of transmission of the beacon, and
the restricted access window begins upon conclusion of the transmission of the at least one of the multicast data and the broadcast data.

5. The access point of claim 1, wherein the beacon indicates an ending time of the restricted access window.

6. An access point comprising:
a restricted access window module configured to define a restricted access window during which stations that belong to a same infrastructure basic service set as the access point are not allowed to transmit data frames;
a beacon creation module configured to generate a beacon announcing the restricted access window, wherein the restricted access window is contained within a following beacon interval;
a transmitter module configured to transmit the beacon to the stations that belong to the same infrastructure basic service set as the access point, wherein the following beacon interval begins upon transmission of the beacon and ends upon transmission of a second beacon, wherein the transmitter module is configured to transmit the second beacon subsequent to the beacon without transmitting any intervening beacons;
a downlink tracking module configured to, during the restricted access window, receive a poll frame from a first station of the stations that belong to the same infrastructure basic service set as the access point; and
a data transmission module configured to, subsequent to the poll frame, transmit a data frame to the first station,
wherein the restricted access window module is configured to define a second restricted access window that is subsequent to the restricted access window but prior to the second beacon, and
wherein the beacon creation module is configured to generate the beacon announcing both the restricted access window and the second restricted access window.

7. The access point of claim 6, wherein:
during the restricted access window, the stations that belong to the same infrastructure basic service set as the access point are permitted to transmit a first set of frame types;

during the second restricted access window, the stations that belong to the same infrastructure basic service set as the access point are permitted to transmit a second set of frame types;
at least one frame type of the first set of frame types is not included in the second set of frame types; and
at least one frame type of the second set of frame types is not included in the first set of frame types.

8. The access point of claim 6, wherein:
during the restricted access window, a first set of the stations that belong to the same infrastructure basic service set as the access point are permitted to transmit;
during the second restricted access window, a second set of the stations that belong to the same infrastructure basic service set as the access point are permitted to transmit;
at least one station in the first set is not included in the second set; and
at least one station in the second set is not included in the first set.

9. The access point of claim 6, wherein:
during the restricted access window, a first set of stations types are permitted to transmit;
during the second restricted access window, a second set of station types are permitted to transmit;
at least one station type in the first set is not included in the second set; and
at least one station type in the second set is not included in the first set.

10. The access point of claim 6, wherein:
during the restricted access window, the stations that belong to the same infrastructure basic service set as the access point are permitted to transmit frames having a first value of a transmission characteristic; and
during the second restricted access window, the stations that belong to the same infrastructure basic service set as the access point are permitted to transmit frames having a second value of the transmission characteristic.

11. The access point of claim 10, wherein the transmission characteristic is one of maximum transmission duration limit and priority.

12. The access point of claim 6, wherein:
during the restricted access window, the stations that belong to the same infrastructure basic service set as the access point are permitted to transmit frames using a first value of a medium access parameter; and
during the second restricted access window, the stations that belong to the same infrastructure basic service set as the access point are permitted to transmit frames using a second value of the medium access parameter.

13. The access point of claim 12, wherein the medium access parameter is slot time.

14. The access point of claim 1, wherein:
the restricted access window module is configured to define the second restricted access window to be subsequent to the restricted access window but prior to the second beacon; and
the transmitter module is configured to, subsequent to transmitting the beacon, transmit a reservation frame to announce the second restricted access window.

15. The access point of claim 14, wherein the transmitter module is configured to transmit the reservation frame upon conclusion of the restricted access window.

16. The access point of claim 15, wherein the transmitter module is configured to transmit the reservation frame at a beginning of the second restricted access window.

17. The access point of claim 1, further comprising an uplink tracking module configured to, during the restricted access window, (i) receive an uplink frame from a second station of the stations that belong to the same infrastructure basic service set as the access point and (ii) selectively respond to the second station with an acknowledgement, wherein the uplink frame indicates that the second station has a second data frame queued for transmission to the access point.

18. The access point of claim 17, wherein the acknowledgement indicates to the second station that the second station is expected to transmit the second data frame to the access point subsequent to the restricted access window.

19. The access point of claim 1, wherein the data transmission module is configured to (i) respond to the poll frame with the data frame in response to the data frame being ready for transmission and (ii) respond to the poll frame with an acknowledgement frame in response to the data frame not being ready for transmission.

20. The access point of claim 19, further comprising a data fetch module configured to, in response to the data frame not being ready for transmission, retrieve the data frame from a queue, wherein the data transmission module is configured to transmit the data frame to the first station subsequent to the restricted access window.

21. The access point of claim 20, wherein the data transmission module is configured to transmit the data frame to the first station in response to receiving a trigger frame from the first station.

22. A method of operating an access point, the method comprising:
defining a restricted access window during which stations that belong to a same infrastructure basic service set as the access point are not allowed to transmit data frames;
generating a beacon announcing the restricted access window, wherein the restricted access window is contained within a following beacon interval;
transmitting the beacon to the stations that belong to the same infrastructure basic service set as the access point, wherein the following beacon interval begins upon transmission of the beacon and ends upon transmission of a second beacon that is transmitted subsequent to the beacon without any intervening beacons;
during the restricted access window, receiving a poll frame from a first station of the stations that belong to the same infrastructure basic service set as the access point; and
subsequent to the poll frame, transmitting a data frame to the first station,
wherein the beacon includes a delivery traffic indication map and includes an indication that the data frame is queued for transmission to the first station,
wherein, during the restricted access window, the stations that belong to the same infrastructure basic service set as the access point are permitted to transmit frames having a first value of a transmission characteristic, and
wherein, during a second restricted access window, the stations that belong to the same infrastructure basic service set as the access point are permitted to transmit frames having a second value of the transmission characteristic.

23. The method of claim 22, further comprising:
transmitting, at a periodic interval, beacons including the delivery traffic indication map, wherein an active polling station is configured to wake up at intervals greater than the periodic interval; and
permitting the active polling station to transmit data frames during the restricted access window.

24. The method of claim 22, wherein the restricted access window begins at a conclusion of transmission of the beacon.

25. The method of claim 22, further comprising:
selectively transmitting at least one of multicast data and broadcast data upon conclusion of transmission of the beacon,
wherein the restricted access window begins upon conclusion of the transmission of the at least one of the multicast data and the broadcast data.

26. The method of claim 22, wherein the beacon indicates an ending time of the restricted access window.

27. A method of operating an access point, the method comprising:
defining a restricted access window during which stations that belong to a same infrastructure basic service set as the access point are not allowed to transmit data frames;
generating a beacon announcing the restricted access window, wherein the restricted access window is contained within a following beacon interval;
transmitting the beacon to the stations that belong to the same infrastructure basic service set as the access point, wherein the following beacon interval begins upon transmission of the beacon and ends upon transmission of a second beacon that is transmitted subsequent to the beacon without any intervening beacons;
during the restricted access window, receiving a poll frame from a first station of the stations that belong to the same infrastructure basic service set as the access point;
subsequent to the poll frame, transmitting a data frame to the first station;
defining a second restricted access window that is subsequent to the restricted access window but prior to the second beacon, wherein the beacon announces both the restricted access window and the second restricted access window; and
transmitting the second beacon.

28. The method of claim 27, wherein:
during the restricted access window, the stations that belong to the same infrastructure basic service set as the access point are permitted to transmit a first set of frame types;
during the second restricted access window, the stations that belong to the same infrastructure basic service set as the access point are permitted to transmit a second set of frame types;
at least one frame type of the first set of frame types is not included in the second set of frame types; and
at least one frame type of the second set of frame types is not included in the first set of frame types.

29. The method of claim 27, wherein:
during the restricted access window, only a first set of the stations that belong to the same infrastructure basic service set as the access point are permitted to transmit;
during the second restricted access window, only a second set of the stations that belong to the same infrastructure basic service set as the access point are permitted to transmit;
at least one station in the first set is not included in the second set; and
at least one station in the second set is not included in the first set.

30. The method of claim 27, wherein:
during the restricted access window, stations that belong to the same infrastructure basic service set as the access point, and are one of a first set of station types, are permitted to transmit;
during the second restricted access window, stations that belong to the same infrastructure basic service set as the access point, and are one of a second set of station types, are permitted to transmit;
at least one station type in the first set is not included in the second set; and
at least one station type in the second set is not included in the first set.

31. The method of claim 27, wherein:
during the restricted access window, the stations that belong to the same infrastructure basic service set as the access point are permitted to transmit frames having a first value of a transmission characteristic; and
during the second restricted access window, the stations that belong to the same infrastructure basic service set as the access point are permitted to transmit frames having a second value of the transmission characteristic.

32. The method of claim 31, wherein the transmission characteristic is one of maximum transmission duration limit and priority.

33. The method of claim 27, wherein:
during the restricted access window, the stations that belong to the same infrastructure basic service set as the access point are permitted to transmit frames using a first value of a medium access parameter; and
during the second restricted access window, the stations that belong to the same infrastructure basic service set as the access point are permitted to transmit frames using a second value of the medium access parameter.

34. The method of claim 33, wherein the medium access parameter is slot time.

35. The method of claim 22, further comprising:
defining the second restricted access window to be subsequent to the restricted access window but prior to the second beacon;
subsequent to transmitting the beacon, transmitting a reservation frame to announce the second restricted access window; and
transmitting the second beacon.

36. The method of claim 35, further comprising transmitting the reservation frame upon conclusion of the restricted access window.

37. The method of claim 36, further comprising transmitting the reservation frame at a beginning of the second restricted access window.

38. The method of claim 22, further comprising during the restricted access window, (i) receiving an uplink frame from a second station of the stations that belong to the same infrastructure basic service set as the access point and (ii) selectively responding to the second station with an acknowledgement, wherein the uplink frame indicates that the second station has a second data frame queued for transmission to the access point.

39. The method of claim 38, wherein the acknowledgement indicates to the second station that the second station is expected to transmit the second data frame to the access point subsequent to the restricted access window.

40. The method of claim 22, further comprising responding to the poll frame with (i) the data frame in response to the data frame being ready for transmission and (ii) an acknowledgement frame in response to the data frame not being ready for transmission.

41. The method of claim 40, further comprising:
in response to the data frame not being ready for transmission, retrieving the data frame from a queue; and
transmitting the data frame to the first station subsequent to the restricted access window.

42. The method of claim 41, further comprising transmitting the data frame to the first station in response to receiving a trigger frame from the first station.

43. The access point of claim 1, wherein the transmission characteristic is one of maximum transmission duration limit and priority.

44. The method of claim 22, wherein the transmission characteristic is one of maximum transmission duration limit and priority.

* * * * *